US008661816B2

(12) United States Patent
Mathews et al.

(10) Patent No.: US 8,661,816 B2
(45) Date of Patent: Mar. 4, 2014

(54) HYBRID COMBUSTION ENERGY CONVERSION ENGINES

(76) Inventors: Will Weldon Mathews, Fairacres, NM (US); Harry Bruce Crower, Jamul, CA (US); Tibor Kiss, Manitou Springs, CO (US)

( * ) Notice: Subject to any disclaimer, the term of this patent is extended or adjusted under 35 U.S.C. 154(b) by 103 days.

(21) Appl. No.: 13/044,947

(22) Filed: Mar. 10, 2011

(65) Prior Publication Data
US 2012/0060493 A1 Mar. 15, 2012

Related U.S. Application Data

(63) Continuation of application No. PCT/US2009/056640, filed on Sep. 11, 2009.

(60) Provisional application No. 61/191,750, filed on Sep. 11, 2008.

(51) Int. Cl.
*F02G 3/00* (2006.01)

(52) U.S. Cl.
USPC .............................. 60/614; 60/602; 123/25 P

(58) Field of Classification Search
USPC .......... 60/614, 618, 624, 670; 123/25 C, 25 J, 123/25 P
See application file for complete search history.

(56) References Cited

U.S. PATENT DOCUMENTS

| 3,172,266 | A | * | 3/1965 | Strohmeyer, Jr. | 60/656 |
| 3,618,577 | A | * | 11/1971 | Shaw et al. | 123/531 |
| 3,672,341 | A | * | 6/1972 | Smith et al. | 123/536 |
| 3,696,795 | A | * | 10/1972 | Smith et al. | 123/1 A |
| 3,921,404 | A | * | 11/1975 | Mason | 60/618 |
| 4,022,172 | A | * | 5/1977 | Fingeroot | 123/553 |
| 4,143,518 | A | * | 3/1979 | Kellogg-Smith | 60/712 |
| 4,150,351 | A | * | 4/1979 | Berg | 335/258 |
| 4,300,353 | A | * | 11/1981 | Ridgway | 60/618 |
| 4,322,950 | A | * | 4/1982 | Jepsen | 60/712 |
| 4,409,932 | A | * | 10/1983 | Gill | 123/25 D |
| 4,433,548 | A | * | 2/1984 | Hallstrom, Jr. | 60/712 |
| 4,552,106 | A | * | 11/1985 | Spence | 123/198 A |
| 4,706,462 | A | * | 11/1987 | Soltermack | 60/712 |
| 4,783,963 | A | * | 11/1988 | Thomas | 60/511 |
| 4,785,631 | A | * | 11/1988 | Striebich | 60/618 |
| 4,790,284 | A | * | 12/1988 | Ferrenberg et al. | 123/543 |

(Continued)

FOREIGN PATENT DOCUMENTS

| EP | 0 142 580 A1 | 5/1985 | |
| JP | 7259548 A * | 10/1995 | F01N 5/02 |
| JP | 10-325370 | 12/1998 | |
| WO | WO 2010030864 A2 * | 3/2010 | F02M 25/02 |

*Primary Examiner* — Kenneth Bomberg
*Assistant Examiner* — Paolo Isada
(74) *Attorney, Agent, or Firm* — Woodard, Emhardt, Moriarty, McNett & Henry LLP

(57) ABSTRACT

A hybrid internal combustion engine having a cylinder, a piston disposed within the cylinder, the piston constructed and arranged to reciprocate within the cylinder, and a combustion chamber defined by the cylinder and the top of the piston. The hybrid internal combustion engine also includes an exhaust manifold and a heat exchanger disposed within the exhaust manifold. A pump disposed between the heat exchanger and a fluid reservoir is provided to deliver fluid from the reservoir to the heat exchanger, whereby the fluid in the heat exchanger is heated and turned into high pressure gas (HPG) when the combustion gases are exhausted from the combustion chamber via the exhaust manifold. The resulting HPG may then be introduced into the combustion chamber to provide a HPG power stroke.

20 Claims, 33 Drawing Sheets

(56) References Cited

U.S. PATENT DOCUMENTS

| | | | |
|---|---|---|---|
| 4,928,658 A * | 5/1990 | Ferrenberg et al. | 123/543 |
| 5,121,607 A * | 6/1992 | George, Jr. | 60/712 |
| 5,191,766 A * | 3/1993 | Vines | 60/619 |
| 5,261,238 A * | 11/1993 | Olsen | 60/620 |
| 5,992,353 A | 11/1999 | Posselt | |
| 6,089,020 A * | 7/2000 | Kawamura | 60/618 |
| 6,253,745 B1 * | 7/2001 | Prater | 123/543 |
| 6,694,737 B2 * | 2/2004 | Tsai et al. | 60/616 |
| 6,986,252 B2 * | 1/2006 | Hedman | 60/712 |
| 7,080,512 B2 * | 7/2006 | Schoell | 60/670 |
| 7,367,306 B1 * | 5/2008 | Holden | 123/250 |
| 7,421,983 B1 * | 9/2008 | Taylor | 123/41.01 |
| 7,549,412 B2 * | 6/2009 | Singh | 123/543 |
| 7,784,280 B2 * | 8/2010 | Schoell | 60/660 |
| 7,793,493 B1 * | 9/2010 | Mcilroy | 60/315 |
| 7,856,822 B2 * | 12/2010 | Schoell | 60/653 |
| 7,856,823 B2 * | 12/2010 | Schoell | 60/653 |
| 7,997,080 B2 * | 8/2011 | Harmon et al. | 60/670 |
| 8,061,140 B2 * | 11/2011 | Harmon, Sr. | 60/670 |
| 8,109,097 B2 * | 2/2012 | Harmon et al. | 60/670 |
| 2003/0188700 A1 * | 10/2003 | Mitsuhashi et al. | 123/25 C |
| 2006/0053793 A1 * | 3/2006 | Schoell | 60/670 |
| 2006/0124079 A1 * | 6/2006 | Singh | 123/25 C |
| 2006/0254278 A1 * | 11/2006 | Schoell | 60/670 |
| 2007/0022977 A1 * | 2/2007 | Crower | 123/25 C |
| 2007/0056287 A1 * | 3/2007 | Schoell | 60/670 |
| 2007/0056288 A1 * | 3/2007 | Schoell | 60/670 |
| 2007/0209611 A1 * | 9/2007 | Buck | 123/41.31 |
| 2007/0240650 A1 * | 10/2007 | Schoell | 123/25 P |
| 2007/0246007 A1 * | 10/2007 | Robinson | 123/316 |
| 2007/0251238 A1 * | 11/2007 | Jordan | 60/645 |
| 2007/0256415 A1 * | 11/2007 | Schoell | 60/645 |
| 2007/0261681 A1 * | 11/2007 | Schoell | 123/556 |
| 2008/0202454 A1 * | 8/2008 | Pirault | 123/58.8 |
| 2008/0216480 A1 * | 9/2008 | Harmon et al. | 60/670 |
| 2008/0271454 A1 * | 11/2008 | Hansen | 60/670 |
| 2009/0205331 A1 * | 8/2009 | Marsh | 60/599 |
| 2009/0205338 A1 * | 8/2009 | Harmon et al. | 60/677 |
| 2009/0293480 A1 * | 12/2009 | Harmon, Sr. | 60/712 |
| 2010/0043743 A1 * | 2/2010 | Maxwell | 123/25 |
| 2010/0077986 A1 * | 4/2010 | Chen | 123/25 |
| 2010/0300100 A1 * | 12/2010 | Harmon et al. | 60/645 |
| 2010/0319636 A1 * | 12/2010 | Buchanan et al. | 123/3 |
| 2010/0326374 A1 * | 12/2010 | Buchanan | 123/3 |
| 2012/0067325 A1 * | 3/2012 | Wathieu et al. | 123/25 C |

* cited by examiner

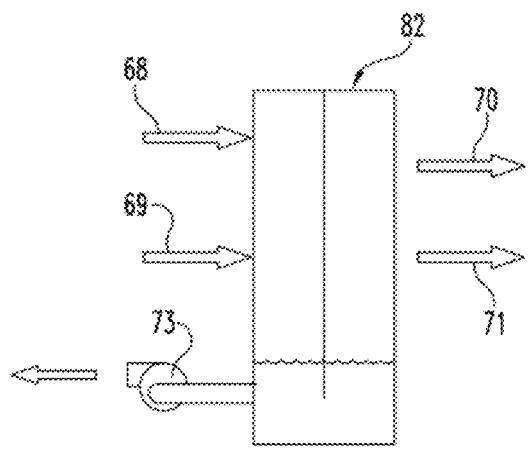
*Fig. 33*
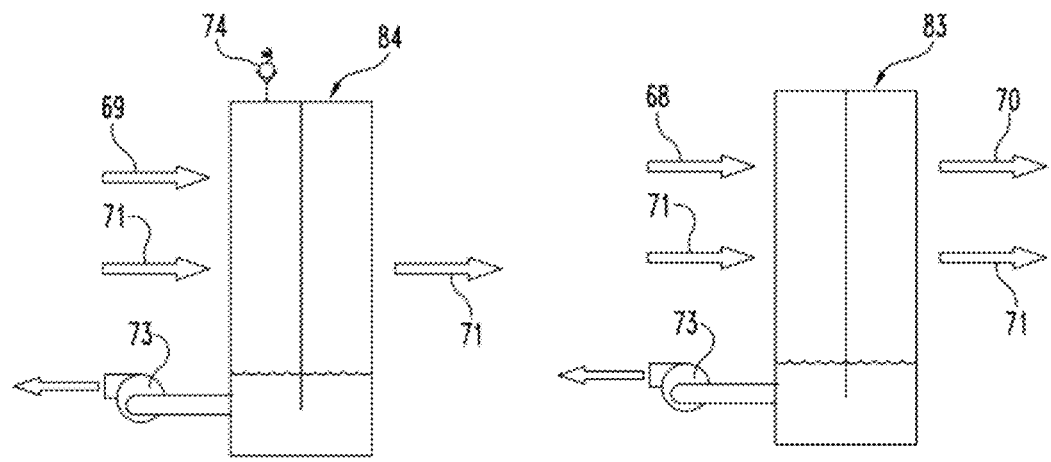
*Fig. 34*  *Fig. 35*

HYBRID COMBUSTION ENERGY CONVERSION ENGINES

CROSS-REFERENCE TO RELATED APPLICATION

This application is a continuation of PCT/US2009/055640, filed Sep. 11, 2009, which is hereby incorporated by reference in its entirety. PCT/US2009/055640 claims the benefit of U.S. Provisional Application No. 61/191,750 filed on Sep. 11, 2008, which is hereby incorporated by reference in its entirety.

BACKGROUND

The present invention relates to internal combustion engines, and more particularly to an apparatus and method of operating the same more efficiently.

Combustion engines exist in a variety of forms, but their common purpose is to provide a means to convert thermal energy into usable power. For example, an Otto four cycle engine uses the pressure resulting from combustion to drive a piston within a closed cylinder. A similar combustion chamber and piston arrangement is used in two cycle and diesel engines. The Brayton cycle used in turbine engines also uses the expansion, pressure rise, and temperature increase from combustion to create thrust and/or rotational power. The high temperature, high pressure gases are expanded across a rotating turbine to create power. Other cycles, such as the Sterling, Ericsson, Rankin, etc., are used to convert thermal energy into usable power.

Cycles such as the Otto cycle are internal combustion cycles. Cycles such as the Rankin or steam cycle are external combustion cycles. The basic processes of a cycle are heat addition, expansion, heat rejection and compression.

Internal combustion engines powered by gasoline and diesel fuels are commonly used to power vehicles and other forms of equipment. Piston type engines reciprocate pistons engaged to crankshafts and commonly use two or four strokes per cycle in their operation. Two cycle internal combustion engines generally mix the lubricating oil with gasoline (or other form of fuel) and employ only a compression stroke to compress the fuel mixture and a firing stroke subsequent to fuel ignition in the combustion chamber. Four cycle piston and rotary engines generally do not mix the lubrication oil with the fuel. Instead, these engines have a compression stroke to compress a mixture of fuel and an oxidizer (such as air). The compression stroke is followed by a firing stroke in which the mixture is ignited and then an exhaust stroke which removes the combustion chamber of the hot gases. Subsequently, an intake stroke pulls in a new volume of the fuel and air mixture into the combustion chamber. A compression stroke follows and the next cycle of operation begins.

In terms of overall energy efficiency an ideal cycle would discharge the working gas at or near ambient or sink temperature. Unfortunately, known cycles discharge combustion gases or working gases at temperatures well above the ambient sink temperature (roughly 59° F. at sea level). For example, the exhaust gas temperature of an Otto cycle engine can reach a temperature in the 1200-1700° F. range. Therefore a considerable amount of energy is wasted in the form of hot exhaust gases. This problem is the result of the combustion gases losing pressure during the expansion stroke much faster than the temperature drops. The resulting pressure is too low to drive the piston while the temperature of the gas remains quite high. It is estimated that the unused power in a standard Otto cycle engine exhaust stream is nearly equal to the cylinder piston power delivered to the crankshaft. Another nearly equal amount of power is used to conduct the excess heat away from the engine via the engine cooling system.

Therefore, current engines waste a significant portion of the energy created by combustion of fuel. Both internal and external combustion engines are inefficient in the conversion of combustion energy into usable power. It is estimated that a typical automobile engine disperses more heat energy into the environment than the energy used to drive the vehicle.

Thus, there is a need for improvement in this field.

SUMMARY

In view of the foregoing, one object of the present disclosure is to improve the energy efficiency of an internal combustion engine.

Specifically, it is an object of the present disclosure to provide an improved system and method for operating an internal combustion engine. The claims, and only the claims, define the invention.

According to one aspect of the present disclosure, a hybrid internal combustion engine having a cylinder, a piston disposed within the cylinder, said piston constructed and arranged to reciprocate within said cylinder, and a combustion chamber defined by the cylinder and the top of the piston. The hybrid internal combustion engine also includes an exhaust manifold and a heat exchanger is disposed within the exhaust manifold. A pump disposed between the heat exchanger and a fluid reservoir is provided to deliver fluid from the reservoir to the heat exchanger, whereby the fluid in the heat exchanger is heated and turned into high pressure gas (HPG) when the combustion gases are exhausted from the combustion chamber via the exhaust manifold. The resulting HPG may then be introduced into the combustion chamber to provide a HPG power stroke.

The various embodiments of the present disclosure describe various devices and methods to recapture wasted heat energy produced when operating combustion engines. Further forms, objects, features, aspects, benefits, advantages, and embodiments of the present invention will become apparent from a detailed description and drawings provided herewith.

BRIEF DESCRIPTION OF THE DRAWINGS

FIG. 33 illustrates a combine exhaust gas and spent steam condenser according to one embodiment of the present disclosure.

FIG. 34 illustrates a high pressure condenser according to one embodiment of the present disclosure.

FIG. 35 illustrates a low pressure condenser according to one embodiment of the present disclosure.

DESCRIPTION OF THE SELECTED EMBODIMENTS

Figure 1:
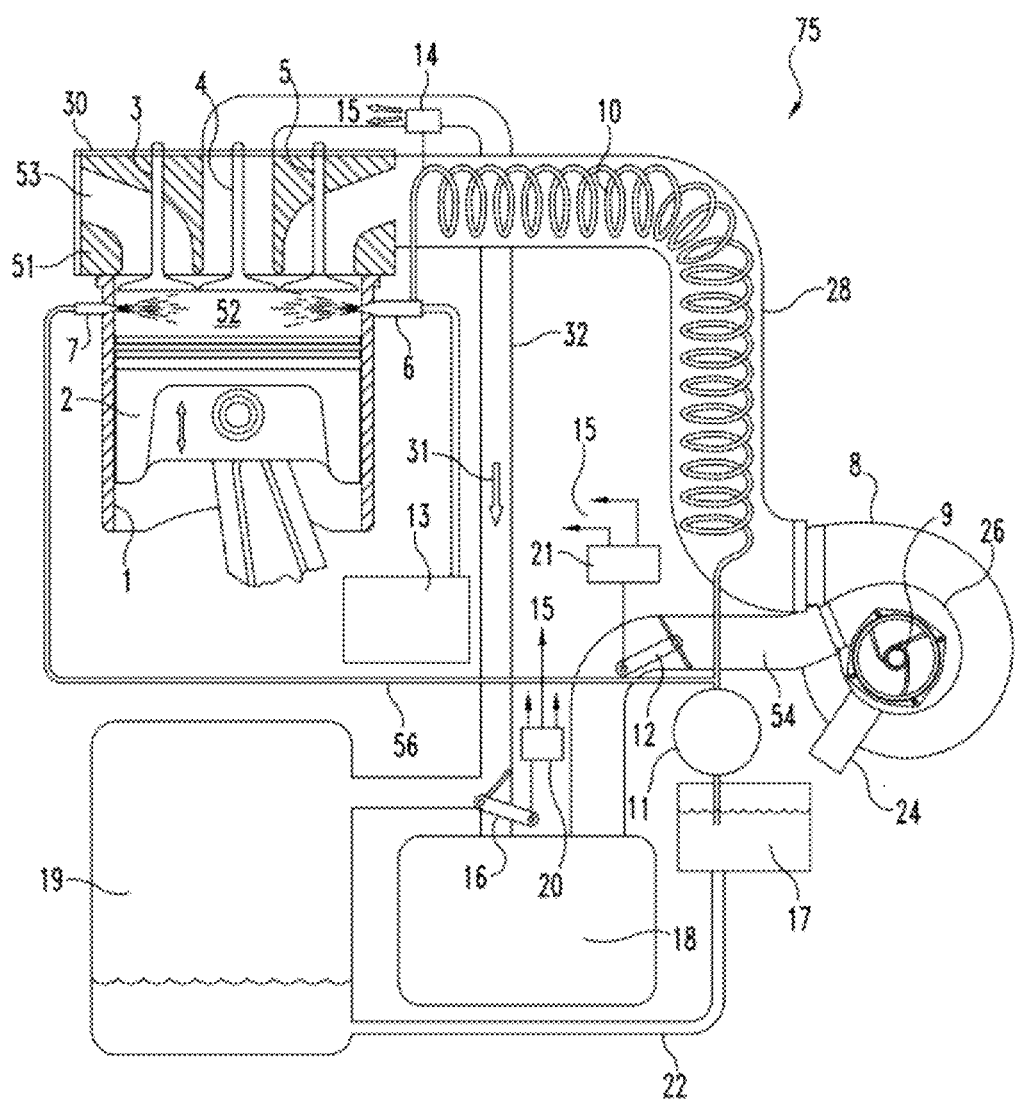
FIG. 1 is a diagrammatic illustration of a three valve cylinder of an internal combustion engine and the accompanying system according to one embodiment of the present disclosure.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates. Some embodiments of the present disclosure are shown in great detail, although it will be apparent to those skilled in the relevant art that some features that are not relevant to the present disclosure may not be shown for the sake of clarity.

The language used in the claims is to only have its plain and ordinary meaning, except as may be explicitly defined herein. Such plain and ordinary meaning is inclusive of all consistent dictionary definitions from the most recently published Webster's dictionaries and Random House dictionaries.

Figure 2:
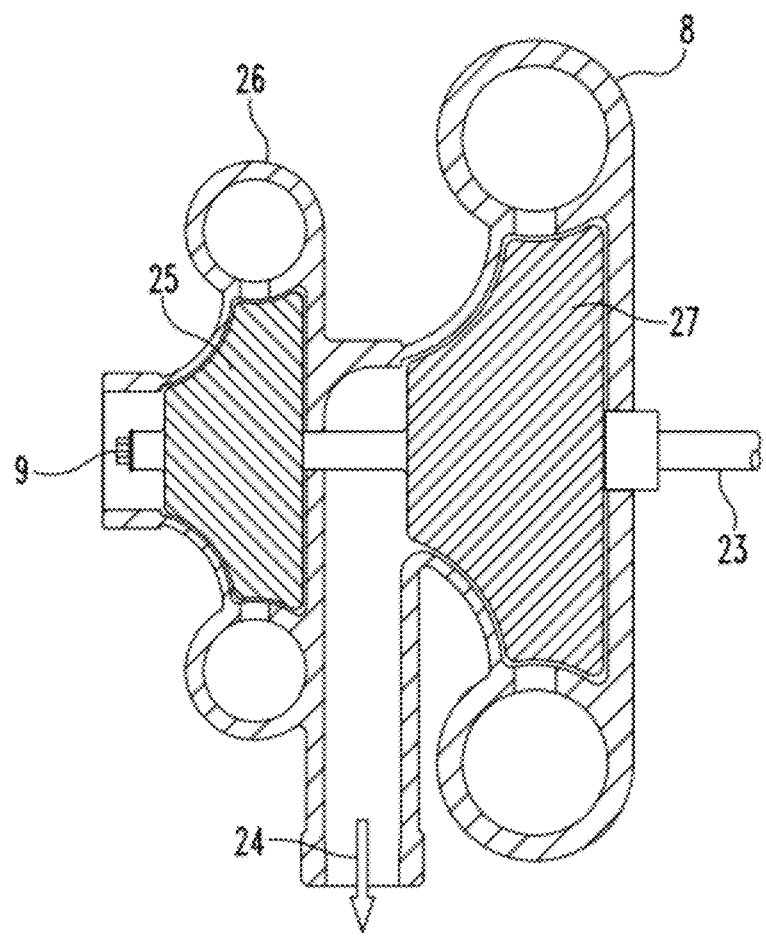
FIG. 2 is a cross-sectional view of a dual turbine turbocharger according to one embodiment of the present disclosure.

Referring generally to FIGS. 1-2, system 75 includes an internal combustion engine having a plurality of cylinders, one of which is shown as cylinder 1. Disposed within cylinder 1 is a reciprocating piston 2 of conventional construction. Cylinder head 51 is disposed within the internal combustion engine. The bottom of cylinder head 51, the top of piston 2 and the walls of cylinder 1 define a combustion chamber 52. A thermal insulating jacket 30 is used in cooperation with cylinder head 51. An intake passage 53 is disposed within cylinder head 51 and communicates with combustion chamber 52. Intake passage 53 is typically closed by an intake valve 3 which is periodically actuated in a conventional manner to enable the intake of air, gasoline, lubricating oil or any combination of the same into combustion chamber 52.

A steam exhaust manifold 32 is provided to communicate with combustion chamber 52 and supplies a steam exhaust passage from combustion chamber 52 to either a steam condenser 19 or a steam accumulator 18 depending on the position of a routing valve 16 which is controlled by a routing valve servo 20. In one embodiment, steam condenser 19 works in connection with a standard vehicle radiator. Routing valve servo 20 is constructed and arranged to control and/or monitor the position of routing valve 16 and communicate such information to ECM 13 via an electronic signal, shown generally as arrows 15. Routing valve servo 20 may send/receive electrical signals 15 to/from ECM 13 through a physical wired connection or wireless communication. Steam exhaust manifold 32 is typically closed by a steam exhaust valve 4 which is periodically actuated to enable the contents of combustion chamber 52 to be exhausted following a steam power stroke, as discussed herein below. The direction of the spent steam return flow is shown generally as arrow 31.

An exhaust manifold 28 is provided to also communicate with combustion chamber 52 and supplies a combustion exhaust passage from combustion chamber 52 to combustion gas turbocharger case 8. Exhaust manifold 28 is typically closed by a combustion exhaust valve 5 which is periodically actuated in a conventional manner to enable the contents of the combustion chamber 52 to be exhausted following a combustion power stroke. As shown, a heat exchanger 10 is disposed within exhaust manifold 28.

Exhaust manifold 28 is communicatively connected to a combustion turbocharger case 8 which encloses an exhaust gas turbine wheel 27. In one embodiment, exhaust gas turbine wheel 27 is constructed of a material capable to operating under ultra high temperatures, such as Inconel 713LC nickel alloy. An exhaust gas turbine outlet 24 is provided as an outlet for the exhausted combustion gases after they have passed over exhaust gas turbine wheel 27. Exhaust gas turbine wheel 27 is connected to turbocharger main shaft 23.

A steam turbine wheel 25, which is disposed within a steam turbocharger case 26, is also connected to turbocharger main shaft 23. In one embodiment, steam turbine wheel 27 is constructed of a medium temperature material, such as AISI H-13 steel. A steam turbine outlet 9 is provided as an outlet for the steam after it has passed over steam turbine wheel 25. As illustrated in FIG. 2, combustion turbocharger case 8 and steam turbocharger case 26 are shown as a single unit. In alternative embodiments, combustion turbocharger case 8 and steam turbocharger case 26 may be constructed separately and fixedly mounted to one another. In one embodiment and as illustrated in FIG. 2, the A/R of steam turbocharger case 26 is smaller than that of combustion exhaust gas turbocharger case 8. As known to those of ordinary skill in the art, A/R is the area ratio of the particular turbocharger, in which A is the area of the inlet and R is the distance from the center of the turbine wheel to the center of the inlet. Generally, a larger A/R will reduce spool up but increase top end performance by allowing more air flow. Conversely, a smaller A/R will increase spool up but reduce top end performance. In the illustrated embodiment, the A/R of steam turbocharger case 26 is selected to provide a quick throttle response and the A/R of combustion exhaust gas turbocharger case 8 is selected to provide optimal performance during normal operation. In other embodiments, the A/R of the steam turbocharger case 26 and combustion exhaust gas turbocharger case 8 may be the same or different.

Mounted in cylinder 1 are a steam injector 6 and liquid injector 7. Steam injector 6 is in electrical connection with and is controlled by an engine control module (ECM) 13. Steam injector 6 is also in fluid connection with a liquid reservoir 17 via a pump 11 and heat exchanger 10. Pump 11 is constructed and arranged to extract liquid from liquid reservoir 17 and force it into and through heat exchanger 10.

A temperature sensor 14 is disposed near the end of heat exchanger 10 proximate to steam injector 6. Temperature sensor 14 is constructed and arranged to monitor the temperature of the contents within heat exchanger 10 and communicate that information to ECM 13 via an electronic signal, shown generally as arrows 15. Temperature sensor 14 may send/receive electrical signals 15 to ECM 13 through a physical wired connection or wireless communication.

Liquid injector 7 is also in fluid connection with liquid reservoir 17 via pump 11 and conduit 56. Liquid reservoir 17 and steam condenser 19 are in fluid connection via conduit 22. According to one embodiment, liquid reservoir 17 is constructed and arranged to allow for freezing at engine shut down. All frozen water in the system is melted when the engine is restarted. As cylinder head 51 increases in temperature and the flow of spent steam, represented by arrow 31, is being routed through the system, any accumulated ice in condenser 19 and liquid reservoir 17 is melted.

As noted above, steam exhaust manifold 32 provides a steam exhaust passage from combustion chamber 52 to either steam condenser 19 or steam accumulator 18 depending on the position of routing valve 16. The steam accumulated in accumulator 18 may be delivered to steam turbine wheel 25, which is enclosed by a steam turbocharger case 26, through accumulated steam conduit 54 depending on the position of a steam throttle control valve 12. Steam throttle control valve 12 is controlled by a steam throttle servo 21 which is constructed and arranged to control and/or monitor the position of steam throttle control valve 12 and communicate such information to ECM 13 via an electronic signal, shown generally by arrows 15. Steam throttle servo 21 may send/receive electrical signals 15 to/from ECM 13 through a physical wired connection or wireless communication. As used herein, arrows 15 generically denote electronic signals sent between ECM 13 and temperature sensor 14, routing valve servo 20 and steam throttle servo 21. As understood by those of skill in the art, the content of the particular electronic signal corresponds to the specific component by which the signal is sent or received.

One embodiment of the operation of system 75 will now be discussed. As noted above, heat exchanger 10 is installed in the combustion exhaust manifold 28. During operation, pump 11 pulls hot liquid (for example, 150-240° F. when using water) from reservoir 17 and maintains a set pressure on the liquid in heat exchanger 10 based on a "look up" table stored in ECM 13. The pre-determined valve pressure stored in the look up table is a function of the final temperature of the high pressure, super-heated gas near steam injector 6 as measured by temperature sensor 14. As temperature sensor 14 periodically measures the temperature, it sends a signal 15 containing the relevant data to ECM 13. The high pressure, superheated gas at the temperature sensor 14 will be nearly equal to the internal combustion exhaust gas temperature. For example, this temperature may be in the range of 1000°-1650° F.

After the internal combustion engine completes the exhaust stroke, the piston 2 is near top dead center. At or near top dead center, intake valve 3, steam exhaust valve 4, and combustion exhaust valve 5 are closed. At this point, injector 6 injects high pressure, super-heated steam into combustion chamber 52. The increased pressure within combustion chamber 52 drives piston 2 down, thereby providing a second power stroke (steam power stroke). As piston 2 approaches full stroke at bottom dead center, the steam exhaust valve 4 opens to expel the spent steam as piston 2 raises and purges the combustion chamber 52.

The spent steam, which has a temperature slightly above boiling point (for example, 220°-250° F. in the case of water steam), travels through steam exhaust manifold 32. The direction of the spent steam flow is indicated by arrow 31. Under normal operating conditions, routing valve 16 directs the spent steam to steam condenser 19, which cools and condenses the steam, returning it to a liquid state. The pressure in steam condenser 19 pushes the condensation back to reservoir 17 via conduit 22.

Additionally, approximately 1.35 pounds of water is produced for each pound of gasoline burned. Therefore, in other embodiments of the present disclosure, additional water is extracted from the combustion exhaust stream. As can be appreciated, condensation and recycling of system liquid reduces the amount of liquid carried on board the vehicle and the drivable range of the vehicle is thereby limited only by the on board fuel supply.

System 75 also has the capability to operate as a regenerative dynamic brake. When the dynamic brake is applied, the camshaft (not shown) advances the valve function. Additionally, ECM 13 controls injector 6 to discharge steam into combustion chamber 52 before piston 2 reaches top dead center on the fifth stroke. The increased pressure within combustion chamber 52 provides a countering force on piston 2 and retards crank shaft rotation, thereby acting as a dynamic brake. When steam exhaust valve 4 opens on the sixth stroke, the spent gas is routed through steam exhaust manifold 32 into steam accumulator 18 because routing valve servo 20, under the control of ECM 13, has shifted the position of routing valve 16.

Pressure builds up in steam accumulator 18 as long as the operator has the dynamic brake applied or adequate temperature is available at temperature sensor 14 as determined by ECM 13. When the operator applies power (i.e., attempts to accelerate in the case of motor vehicle operation), steam throttle servo 21 opens steam throttle control valve 12, thereby routing the accumulated, high pressure steam to and spinning steam turbine wheel 25. Therefore, the instantaneously available high pressure eliminates turbocharger lag. In addition, the internal combustion engine operates at high intake manifold pressure while the combustion products exhaust gas pressure and temperatures are low. In effect, the engine operates as an air motor until steam accumulator 18 energy has been depleted, thus recapturing the braking energy. When the internal combustion engine returns to normal operation, the turbocharger is driven by the combustion exhaust gases via the exhaust gas turbocharger case 8 and the exhaust gas turbine wheel 27.

In the embodiment illustrated in FIG. 1, the engine is constructed to be nearly adiabatic as possible by enclosing cylinder head 51 in an insulating jacket 30. The adiabatic engine preserves the combustion energy that is not used to rotate the crankshaft. That energy can then be used to power the steam power cycle and/or supply energy for dynamic braking. In the embodiment shown in FIG. 1, only cylinder head 51 is insulated by insulating jacket 30. In additional embodiments, further components are insulated by insulating jacket 30, such as cylinder 1, combustion turbocharger case 8, pump 11, reservoir 17, steam accumulator 18, conduit 22, steam turbocharger case 26, exhaust manifold 28, steam exhaust manifold 32, cylinder head 51 and/or accumulated steam conduit 54. If the cylinder head 51 or engine temperature rises above a set limit, warm liquid injector 7 is used to inject liquid directly to combustion chamber 52 to control the temperature. The source of the warm liquid is reservoir 17, which is immediately downstream of pump 11.

Referring now to FIGS. 3-9, a further embodiment of the present disclosure is illustrated. A cylinder head assembly 76 is shown which utilizes a four valve cylinder design. Cylinder head assembly 76 is used in connection with system 77, see FIG. 9. For the sake of clarity and brevity, many of the same reference numerals that are used in FIG. 1 are used in FIGS. 3-9 to represent essentially same the components which are present in both embodiments.

As illustrated, a cylinder head assembly 76 includes reciprocating piston 2 disposed within cylinder 1. Cylinder head 51 is disposed within an internal combustion engine. The bottom of cylinder head 51, the top of piston 2 and the walls of cylinder 1 define combustion chamber 52. Intake passage 53 is disposed within cylinder head 51 and communicates with combustion chamber 52. Intake passage 53 is typically closed by an intake valve 33 which is periodically actuated in a conventional manner to enable the intake of air, gasoline, lubricating oil or any combination of the same into combustion chamber 52.

Steam exhaust manifold 32 is provided to communicate with combustion chamber 52 and supplies a steam exhaust passage from combustion chamber 52. Steam exhaust manifold 32 is typically closed by a steam exhaust valve 38 which is periodically actuated to enable the contents of combustion chamber 52 to be exhausted following a steam power stroke. The direction of the spent steam return flow is shown generally as arrow 31.

A combustion exhaust conduit 36 is provided to also communicate with combustion chamber 52 and supplies a combustion exhaust passage from combustion chamber 52. Combustion exhaust conduit 36 is typically closed by a combustion exhaust valve 35 which is periodically actuated in a conventional manner to enable the contents of the combustion chamber 52 to be exhausted following a combustion power stroke. Combustion exhaust conduit 36 is in fluid communication with exhaust manifold 28. As shown, heat exchanger 10 is disposed within combustion exhaust conduit 36 and exhaust manifold 28.

In the illustrated embodiment, heat exchanger 10 is in fluid connection with a steam conduit 55 which is provided to supply a passage for high pressure steam to combustion chamber 52. Steam conduit 55 is typically closed by steam inlet valve 37 which is periodically actuated to allow steam to enter combustion chamber 52 during a high pressure gas power stroke. A steam inlet throttle 39 is disposed within steam conduit 55 upstream of combustion chamber 52. Steam inlet throttle 39 allows for the amount of steam entering combustion chamber 52 to be precisely controlled by ECM 13 via a wired or wireless communication connection or other means known in the art. Temperature sensor 14 is disposed near the end of heat exchanger 10 proximate to steam conduit 55.

An insulating jacket 30 (also used in system 75) is disposed around the top portion of cylinder head assembly 76. As shown in the illustrated embodiments, insulating jacket 30 encloses a condensate reservoir 40. Condensate reservoir 40 assists in the cooling of cylinder head assembly 76. A coolant level sensor 41 is provided to detect the amount of coolant present in condensate reservoir 40. Though coolant level sensor 41 is shown outside of insulating jacket 30, in other embodiments it is also provided inside of insulating jacket 30. Coolant level sensor 41 is in electrical connection with ECM 13 via a physically wired or wireless communication connection.

As illustrated, heat exchanger 10 is partially disposed within condensate reservoir 40. In one embodiment, the form of cavity containing reservoir 40 is constructed and arranged to allow freezing of the water without damaging the surrounding structure. Additionally, the water present in condenser 19 and the associated plumbing may be drained at engine shut down.

In order to provide fresh coolant to condensate reservoir 40, it is in fluid connection with reservoir 17 via conduit 56 and pump 11. Also disposed upstream from pump 11 along conduit 56 is a valve 43, which is controlled by ECM 13. When valve 43 is opened, coolant can be returned to reservoir 40, as shown generally by arrow 44. Additionally, condensate reservoir 40 is in fluid connection with condenser 19 via conduit 29. Therefore, conduits 29 and 56 allow for coolant to be introduced and expunged, respectively, from reservoir 40.

Figure 3:
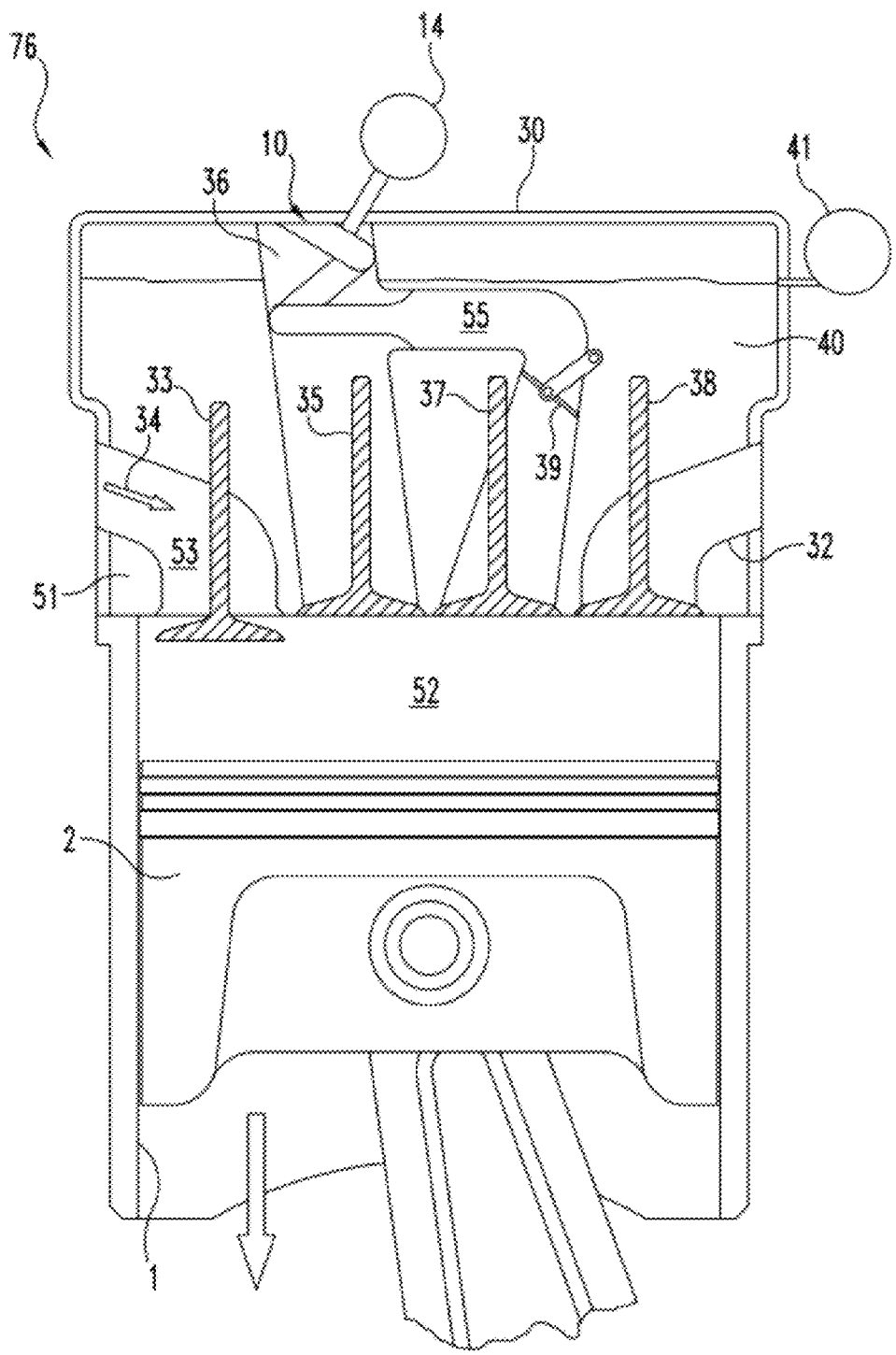
FIG. 3 is a diagrammatic illustration of a four valve cylinder of an internal combustion engine during an intake stroke according to one embodiment of the present disclosure.
Figure 4:
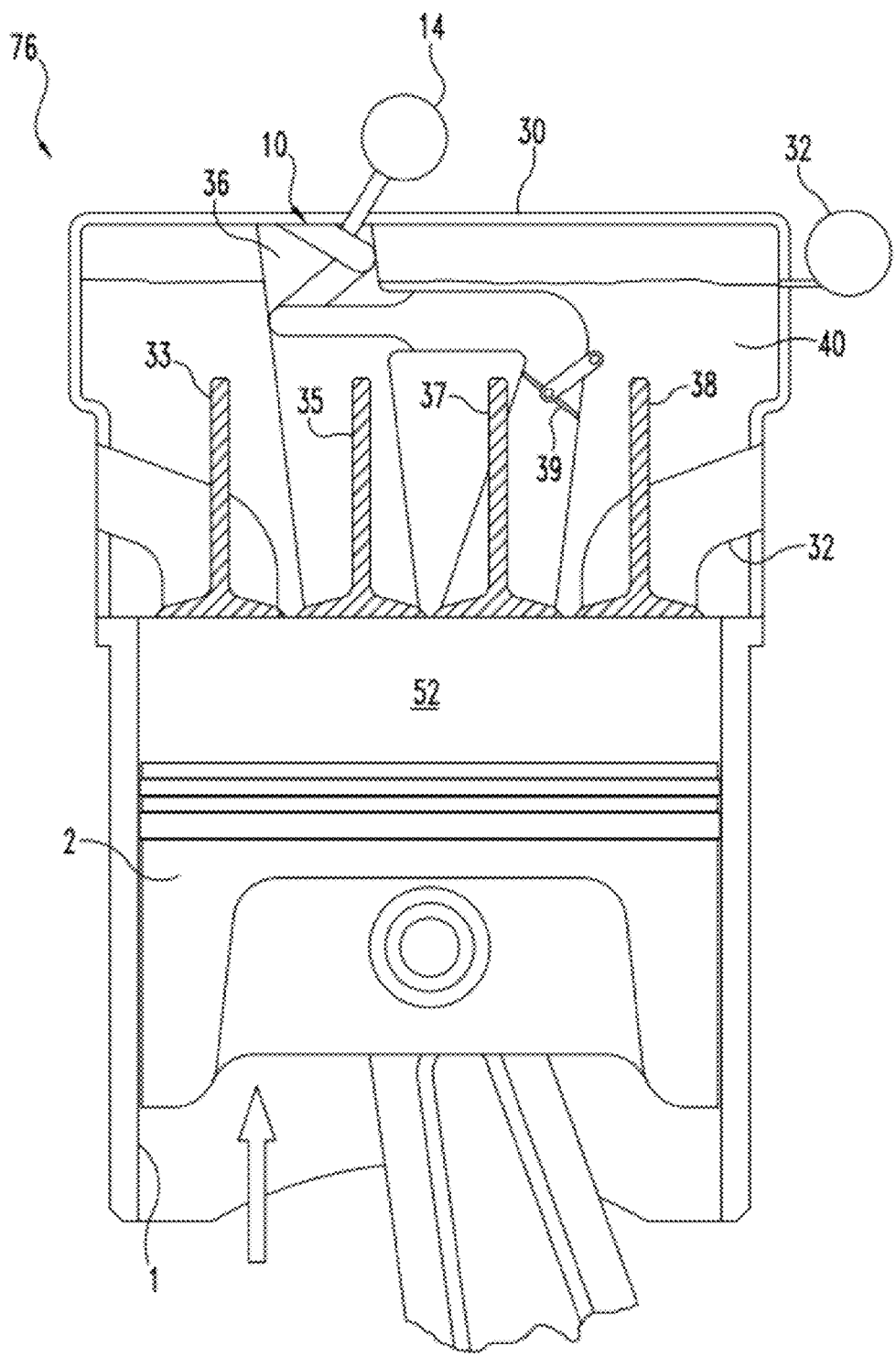
FIG. 4 is a diagrammatic illustration of a four valve cylinder of an internal combustion engine during a compression stroke according to one embodiment of the present disclosure.
Figure 5:
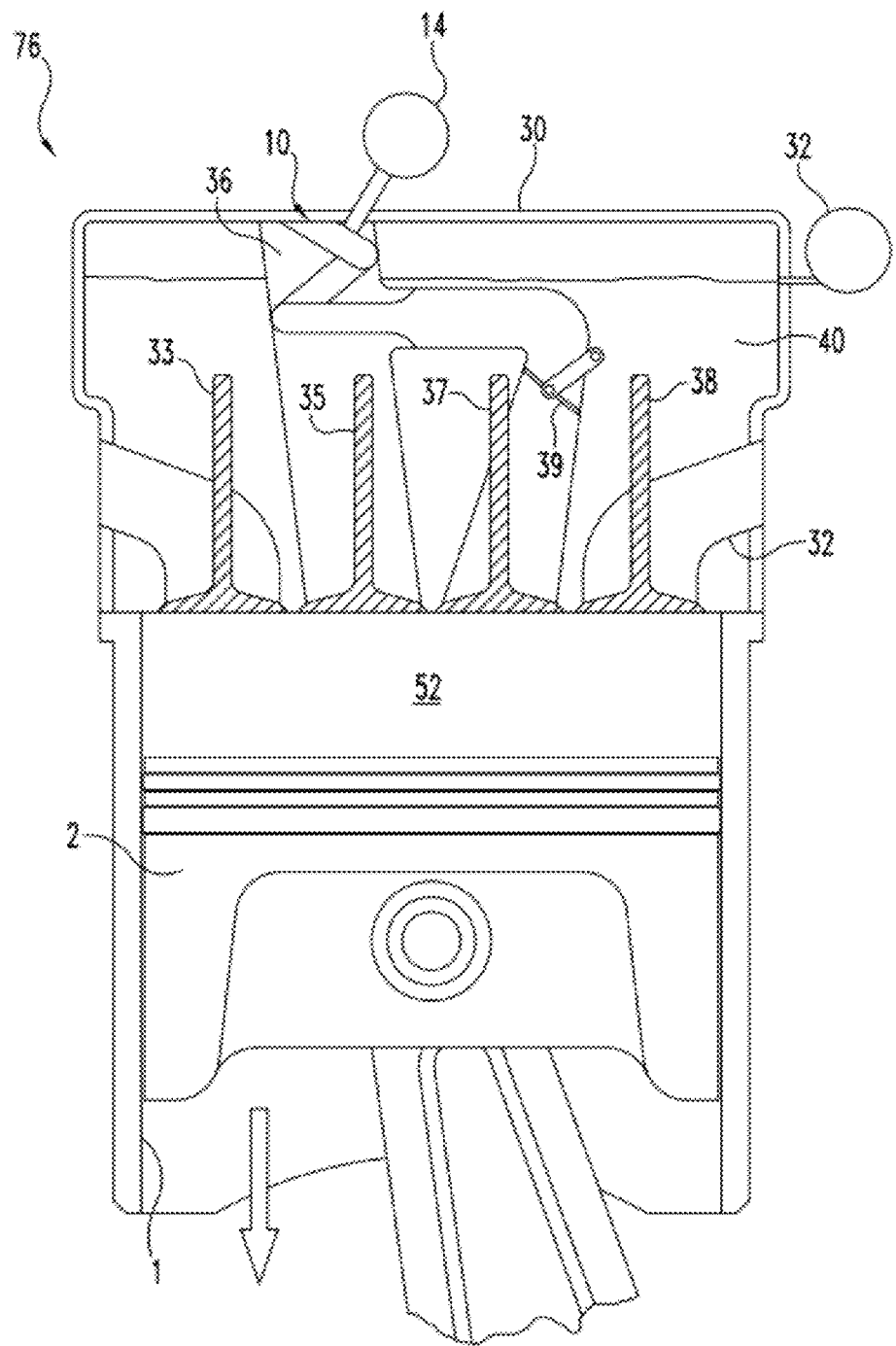
FIG. 5 is a diagrammatic illustration of a four valve cylinder of an internal combustion engine during a combustion power stroke according to one embodiment of the present disclosure.

One embodiment of the operation of FIGS. 3-8 will now be discussed. FIG. 3 illustrates the cylinder head assembly 76 and piston 2 during the fuel and oxidizer intake stroke. As piston 2 moves down, intake valve 33 is released and fuel and oxidizer is forced into combustion chamber 52. The flow of the fuel and oxidizer is shown generally by arrow 34. When piston 2 is near bottom dead center, intake valve 33 closed. Piston 2 begins to travel up cylinder 1 and begins the compression stroke (FIG. 4). Near top dead center, combustion takes place. The combustion may be a result of the compression forces igniting the fuel, as in the case of a diesel engine, or a result of a sparked ignition, as in the case of a standard gasoline engine. Regardless, the combustion of the fuel provides a downward force on piston 2, resulting in a combustion power stroke (FIG. 5).

Figure 6:
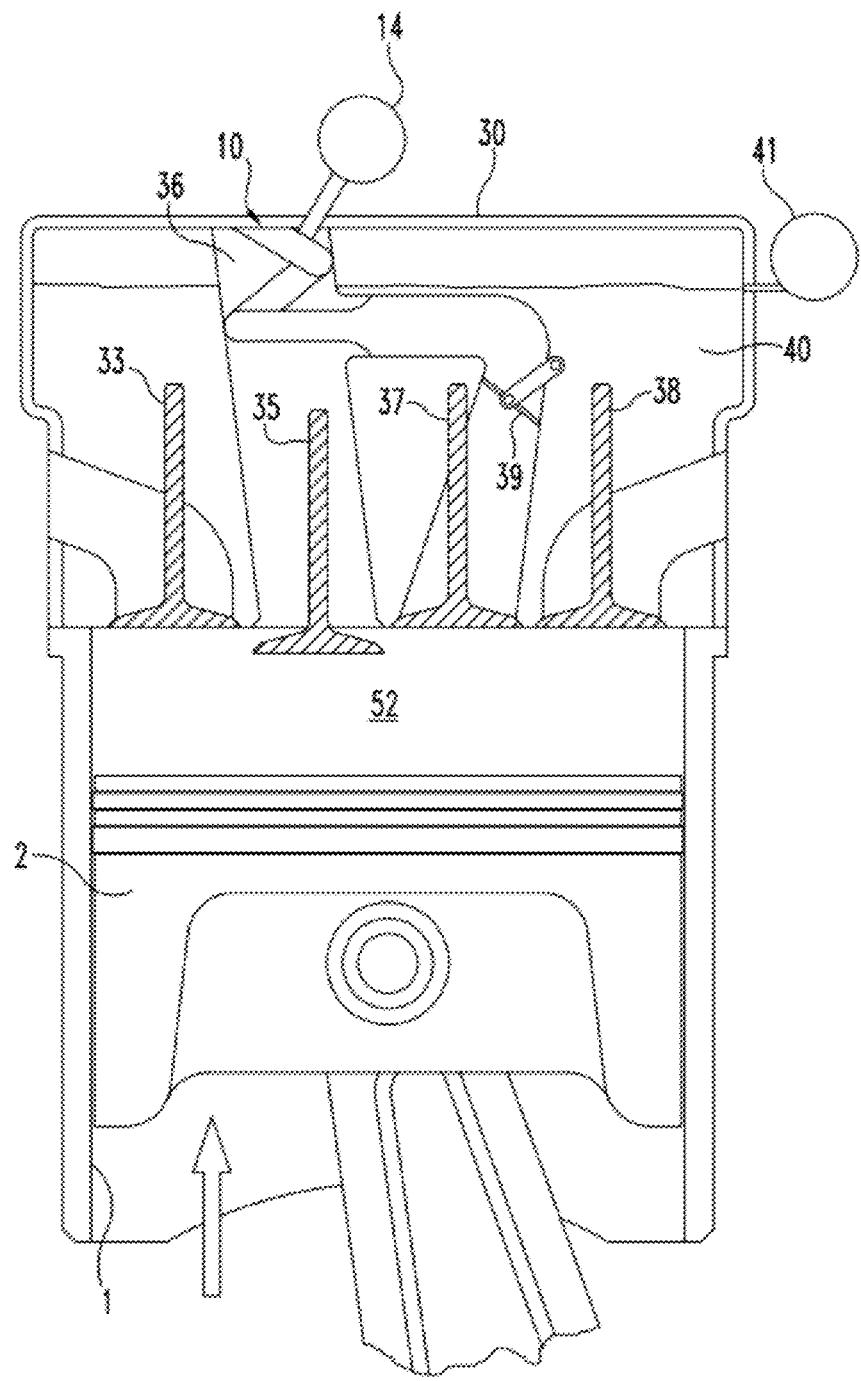
FIG. 6 is a diagrammatic illustration of a four valve cylinder of an internal combustion engine during a combustion exhaust stroke according to one embodiment of the present disclosure.

After piston 2 has reached bottom dead center and begins moving up, combustion exhaust valve 35 is opened and the combusted gases are forced out of combustion chamber 52 via combustion exhaust conduit 36 and exhaust manifold 32 (FIG. 6). As the hot exhaust gases surround and pass heat exchanger 10, heat is transferred to the liquid inside heat exchanger 10 and it is turned to steam. The liquid/gas within heat exchanger 10 is then maintained at an ECM 13 controlled pressure. In another embodiment, the liquid/gas is maintained at a constant pressure.

Figure 7:
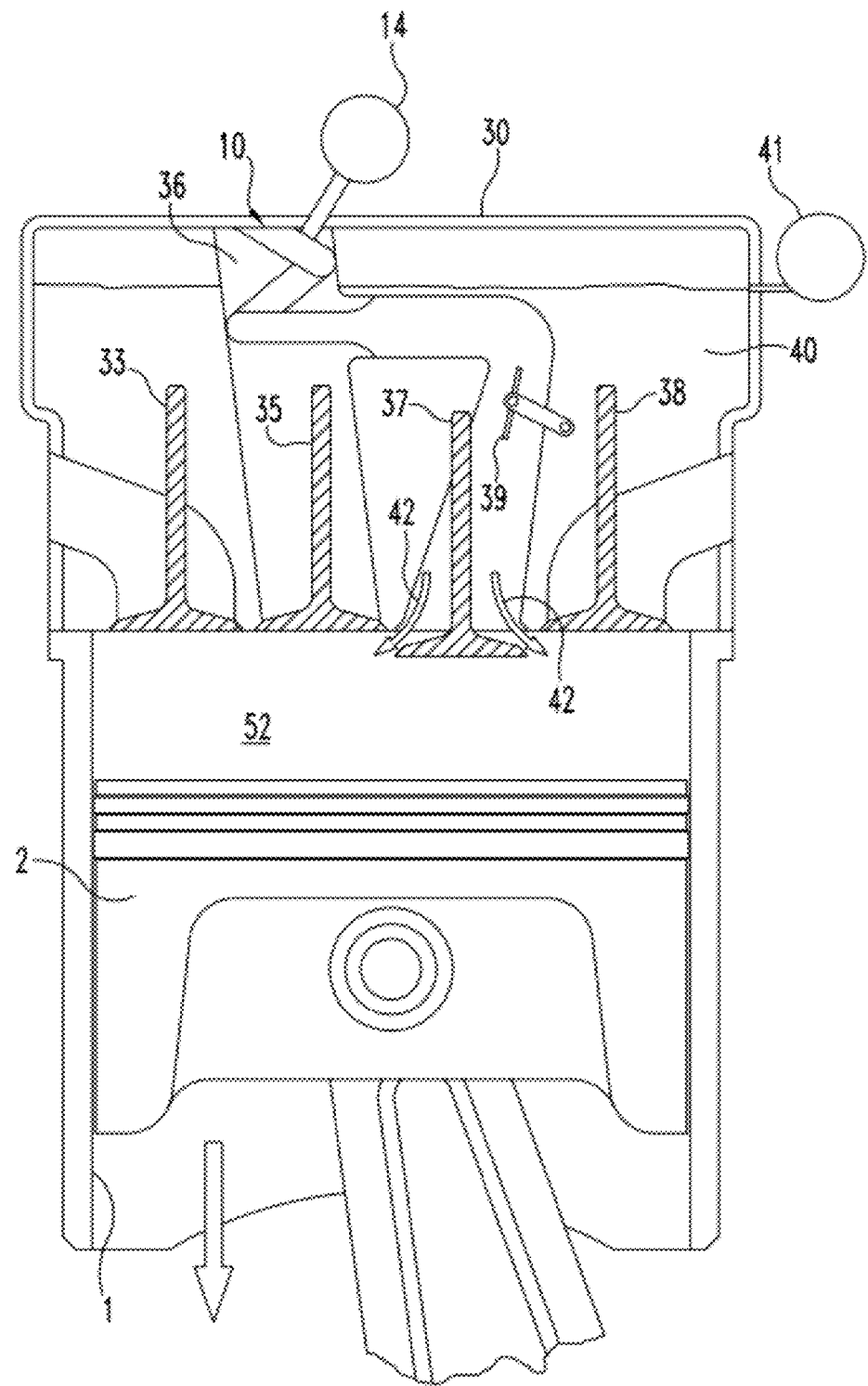
FIG. 7 is a diagrammatic illustration of a four valve cylinder of an internal combustion engine during a high pressure gas power stroke according to one embodiment of the present disclosure.

As piston 2 reaches top dead center, combustion exhaust valve 35 closes and steam inlet valve 37 is opened, resulting in a high pressure gas power stroke (FIG. 7). As steam inlet valve 37 is opened, the high pressure steam built up in heat exchanger 10 is released into combustion chamber 52, thereby increasing the pressure inside combustion chamber 52 and forcing piston 2 downward. The incoming flow of steam is shown generally by arrows 42. The position of steam inlet throttle 39 can control the amount of steam that flows through steam conduit 55 and into combustion chamber 52.

Figure 8:
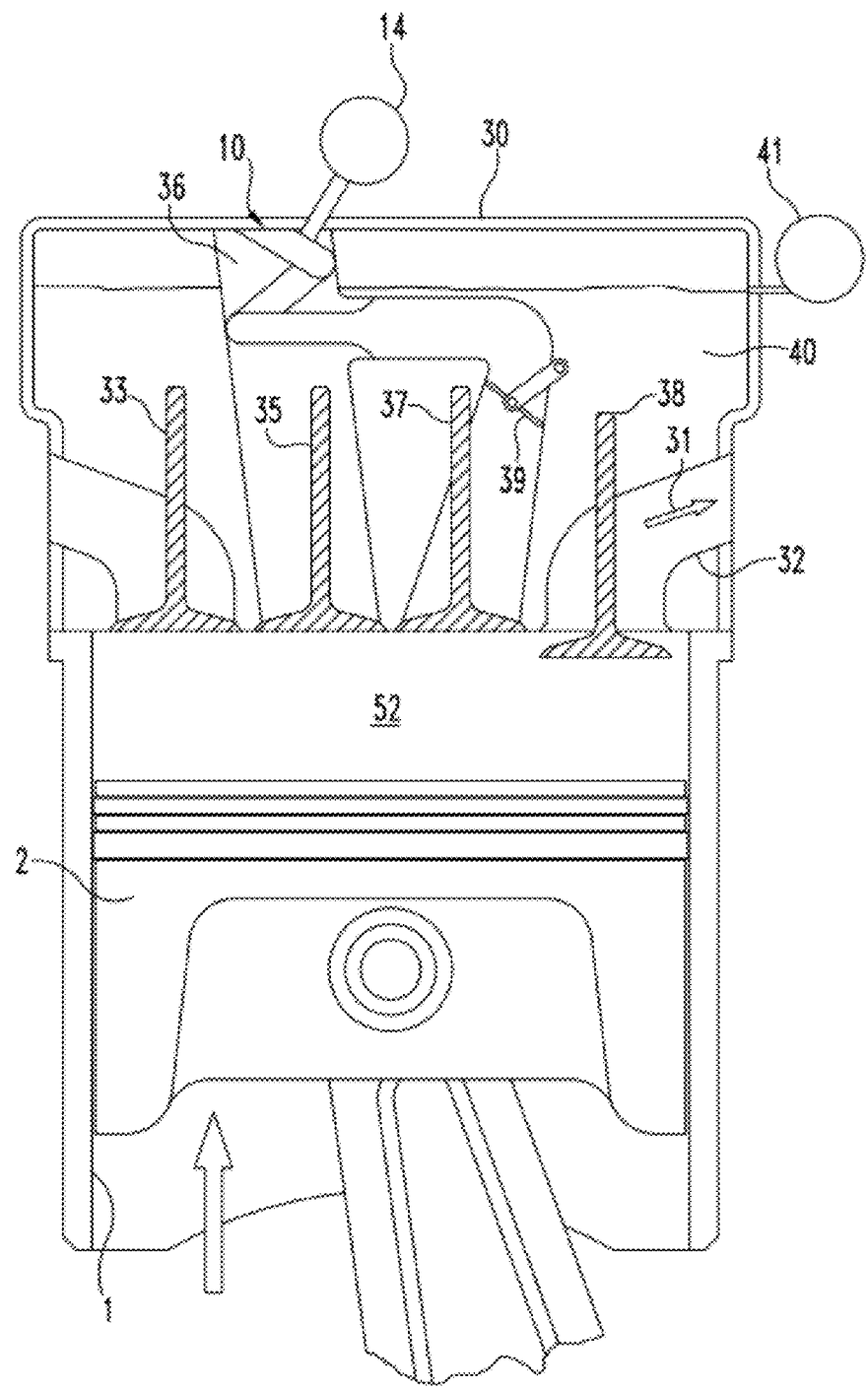
FIG. 8 is a diagrammatic illustration of a four valve cylinder of an internal combustion engine during a high pressure gas exhaust stroke according to one embodiment of the present disclosure.
Figure 9:
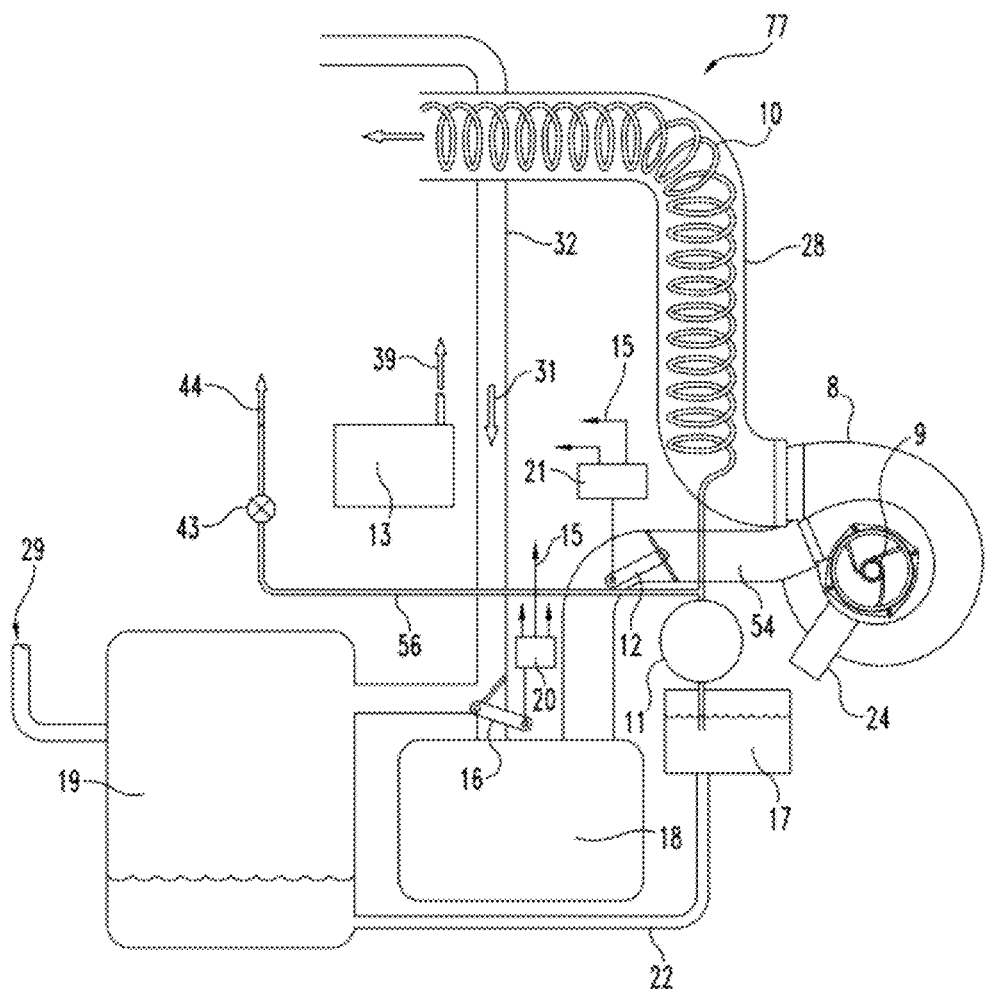
FIG. 9 is a diagrammatic illustration of the system accompanying the four valve cylinder illustrated in FIGS. 3-8 according to one embodiment of the present disclosure.
Figure 10:
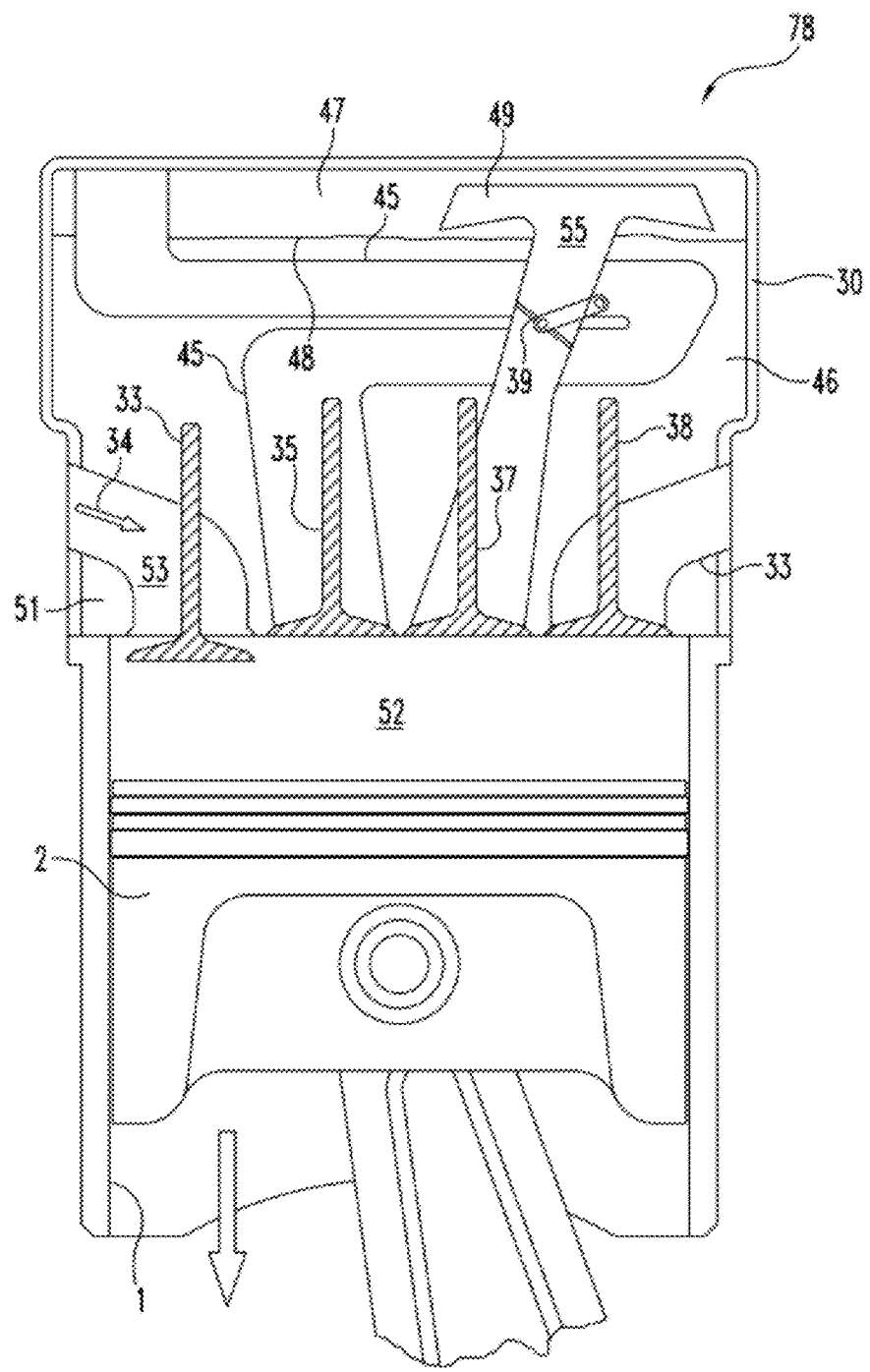
FIG. 10 is a diagrammatic illustration of a four valve cylinder of an internal combustion engine during an intake stroke according to one embodiment of the present disclosure.
Figure 11:
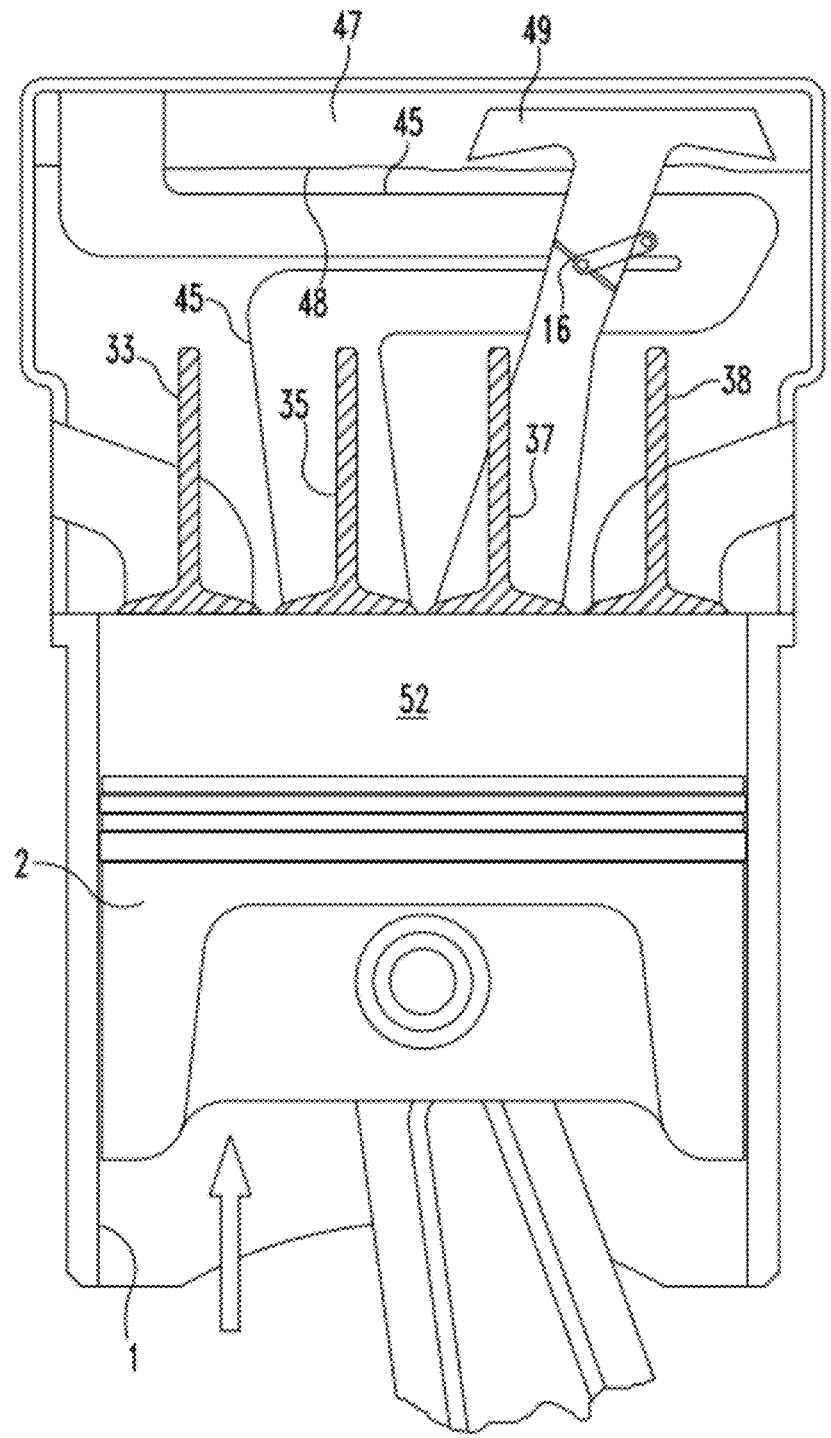
FIG. 11 is a diagrammatic illustration of a four valve cylinder of an internal combustion engine during a compression stroke according to one embodiment of the present disclosure.
Figure 12:
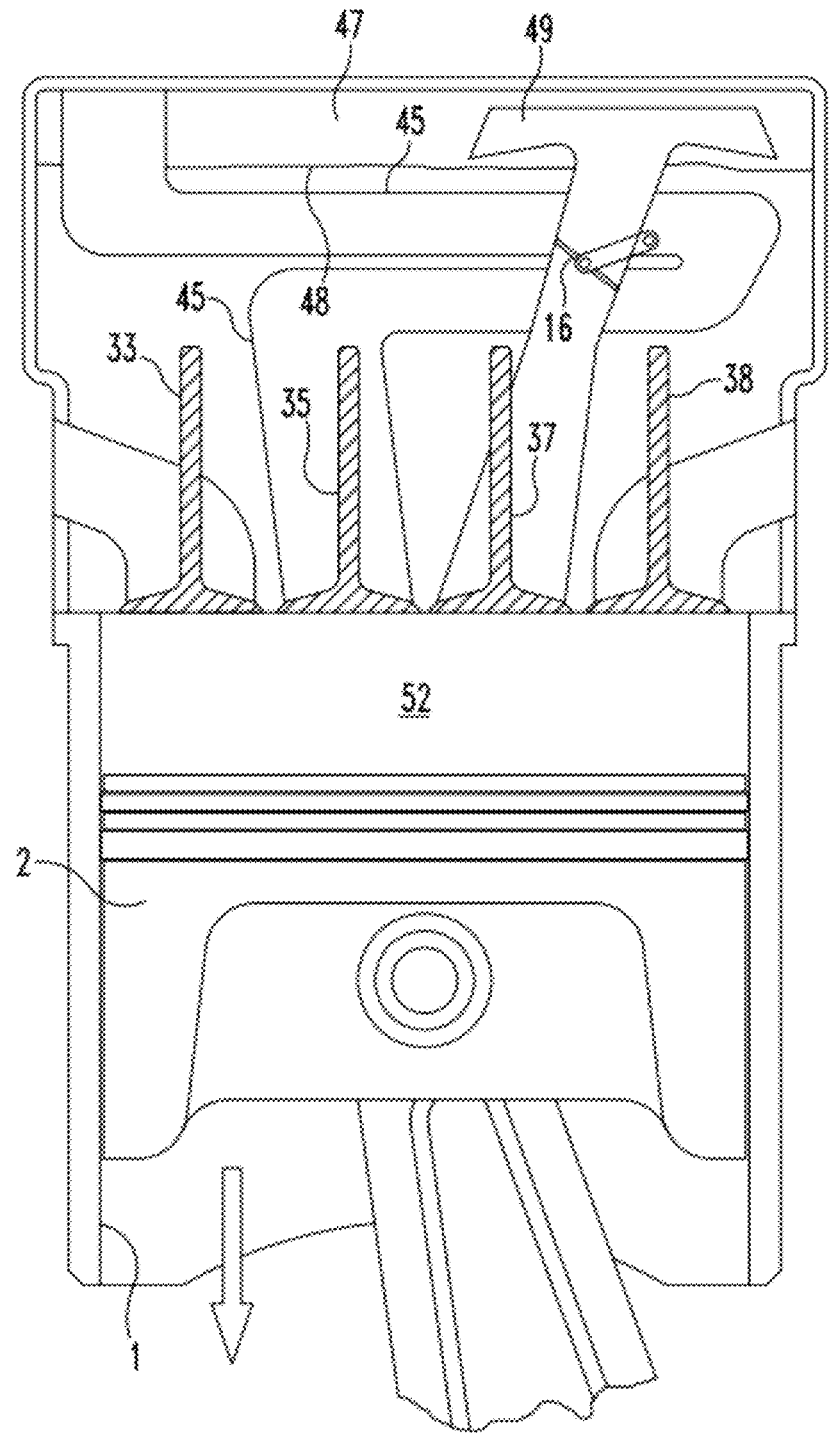
FIG. 12 is a diagrammatic illustration of a four valve cylinder of an internal combustion engine during a combustion power stroke according to one embodiment of the present disclosure.
Figure 13:
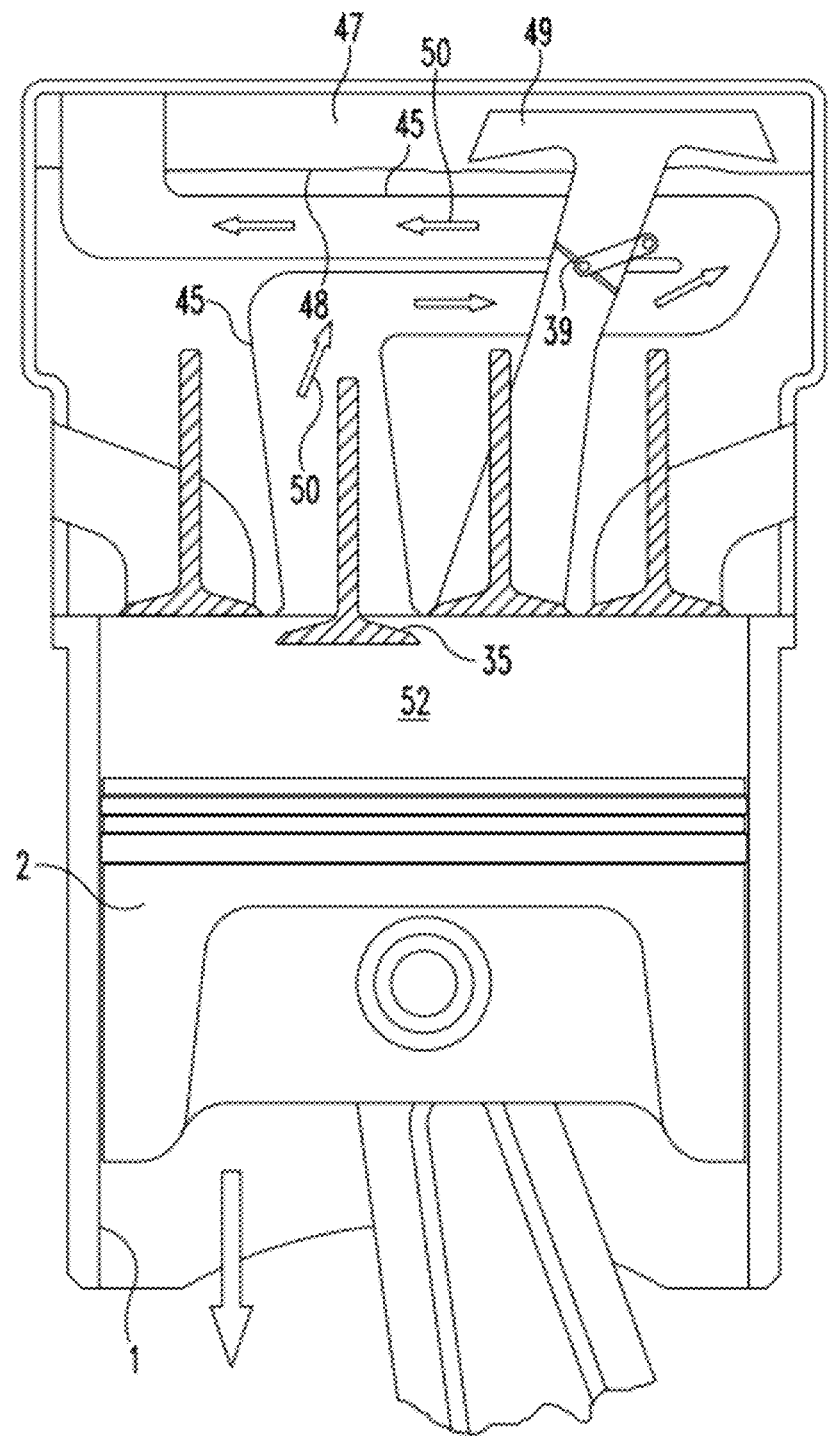
FIG. 13 is a diagrammatic illustration of a four valve cylinder of an internal combustion engine during a combustion exhaust stroke according to one embodiment of the present disclosure.
Figure 14:
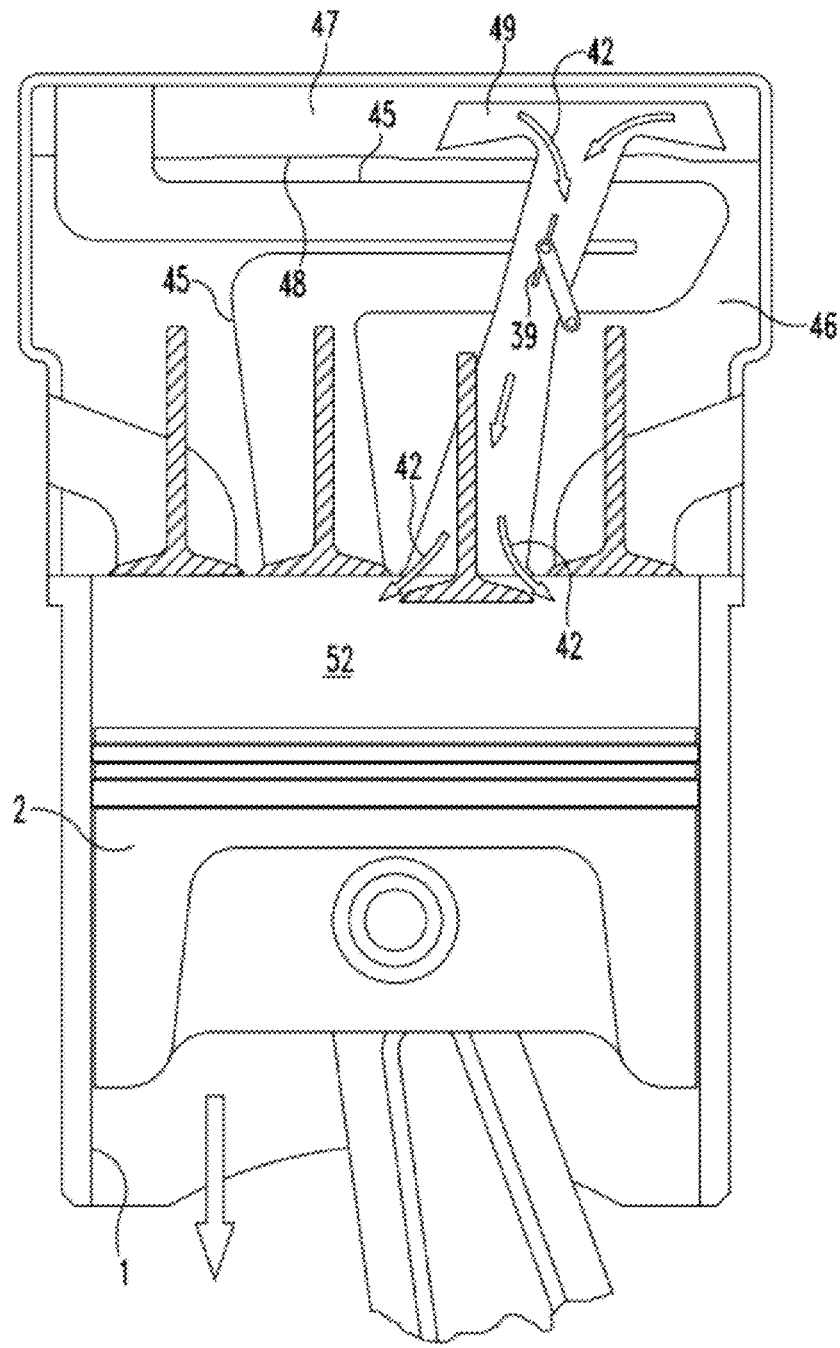
FIG. 14 is a diagrammatic illustration of a four valve cylinder of an internal combustion engine during a high pressure gas power stroke according to one embodiment of the present disclosure.

The spent gas exhaust stroke begins as piston 2 moves up. Steam inlet valve 37 is closed and steam exhaust valve 38 is opened (FIG. 8). As piston 2 rises within cylinder 1, it forces the spent steam out of the combustion chamber 52 and into steam exhaust manifold 32. The direction of spent gas flow is shown generally by arrow 31. As can be appreciated, the disclosed operation provides an additional power stroke with no fuel consumption.

Figure 15:
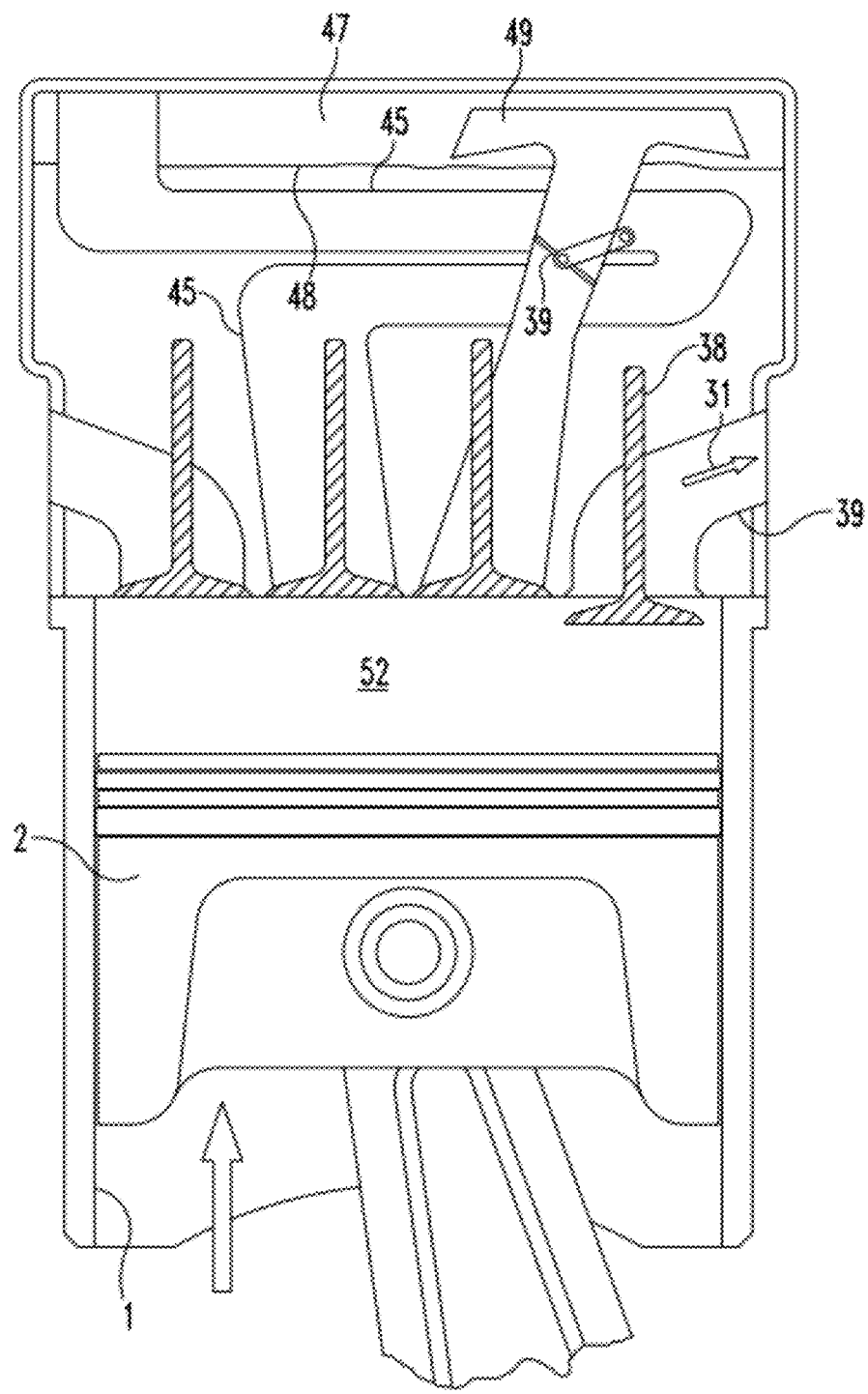
FIG. 15 is a diagrammatic illustration of a four valve cylinder of an internal combustion engine during a gas exhaust stroke according to one embodiment of the present disclosure.
Figure 16:
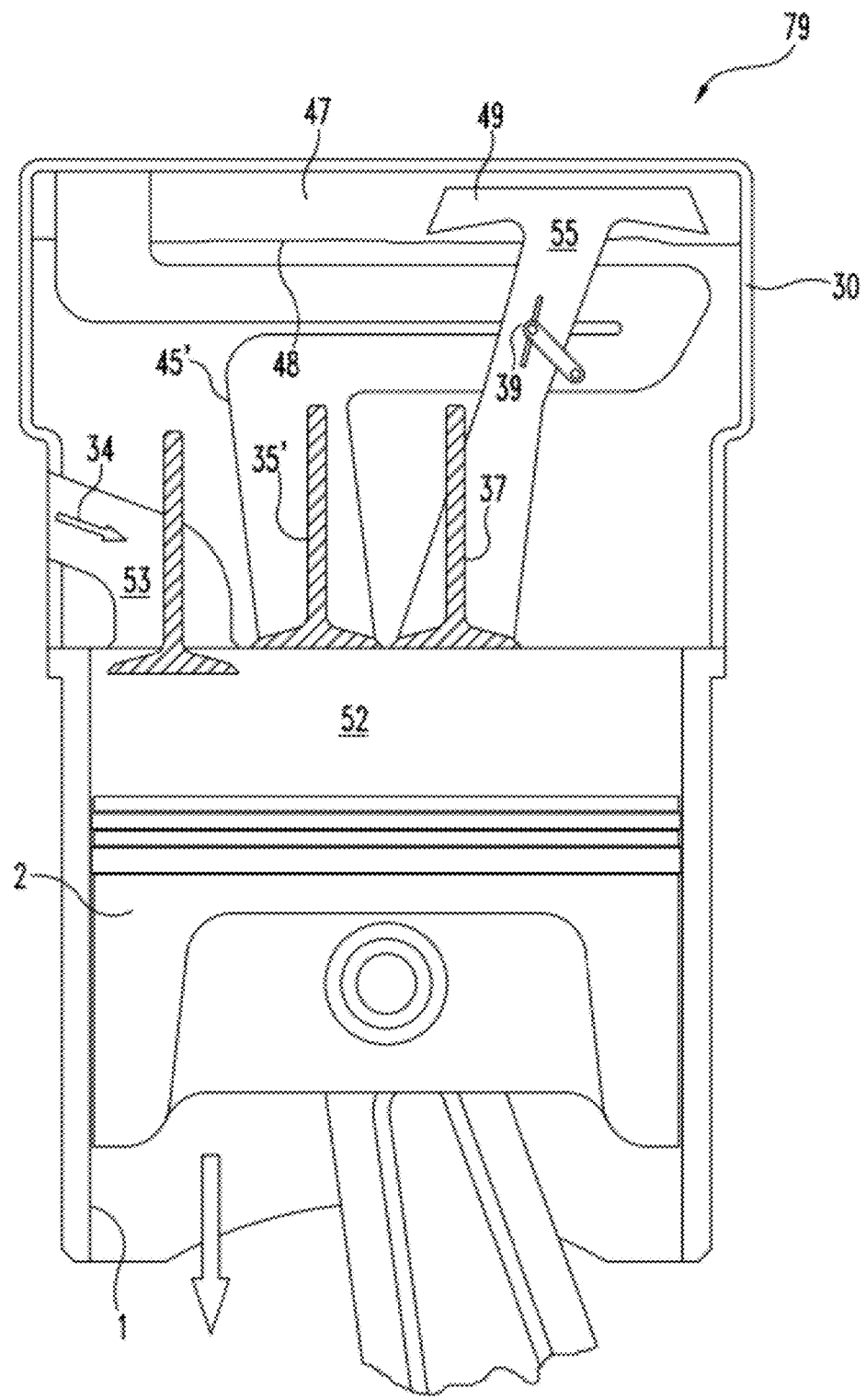
FIG. 16 is a diagrammatic illustration of a three valve cylinder of an internal combustion engine during an intake stroke according to one embodiment of the present disclosure.
Figure 17:
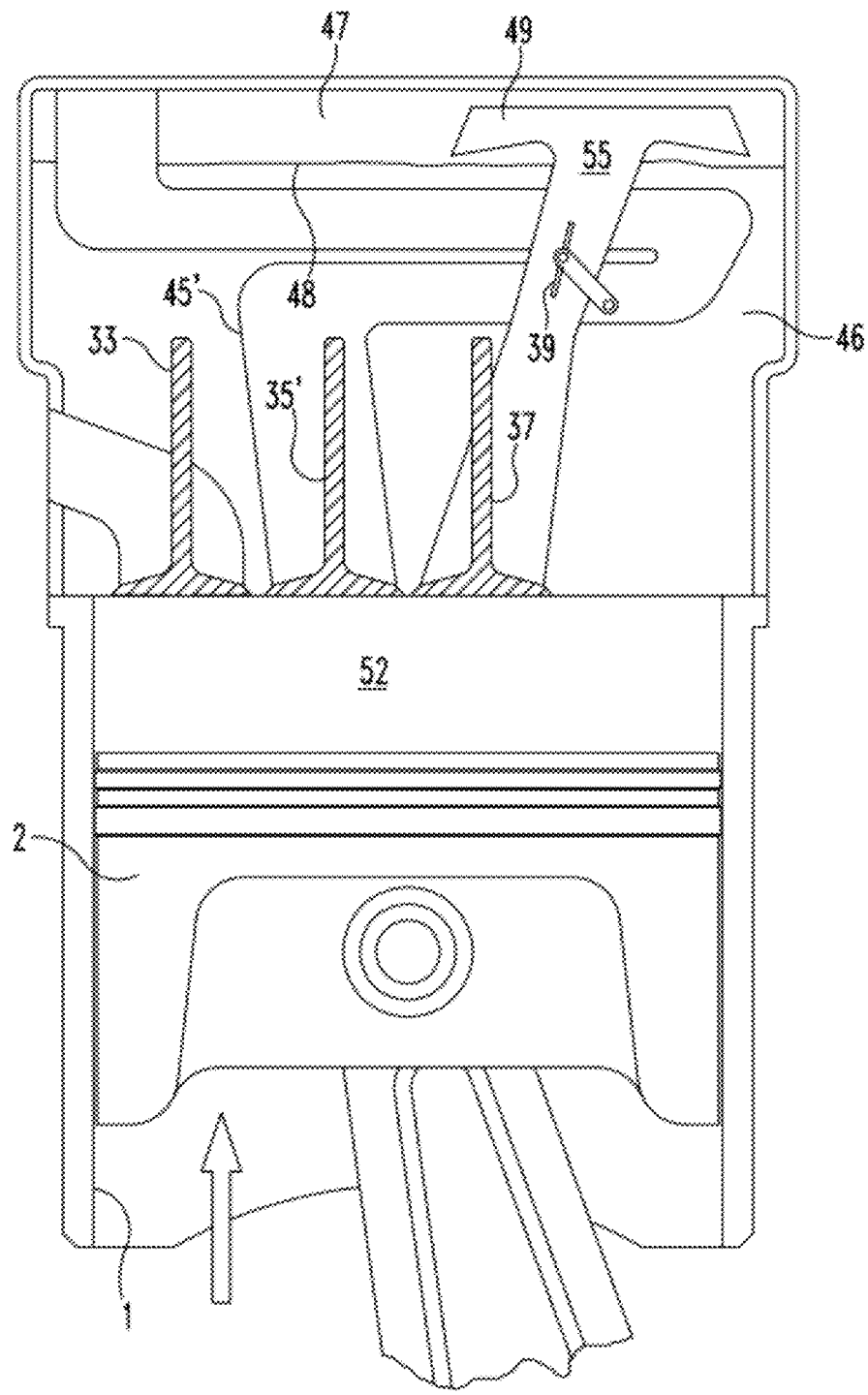
FIG. 17 is a diagrammatic illustration of a three valve cylinder of an internal combustion engine during a compression stroke according to one embodiment of the present disclosure.
Figure 18:
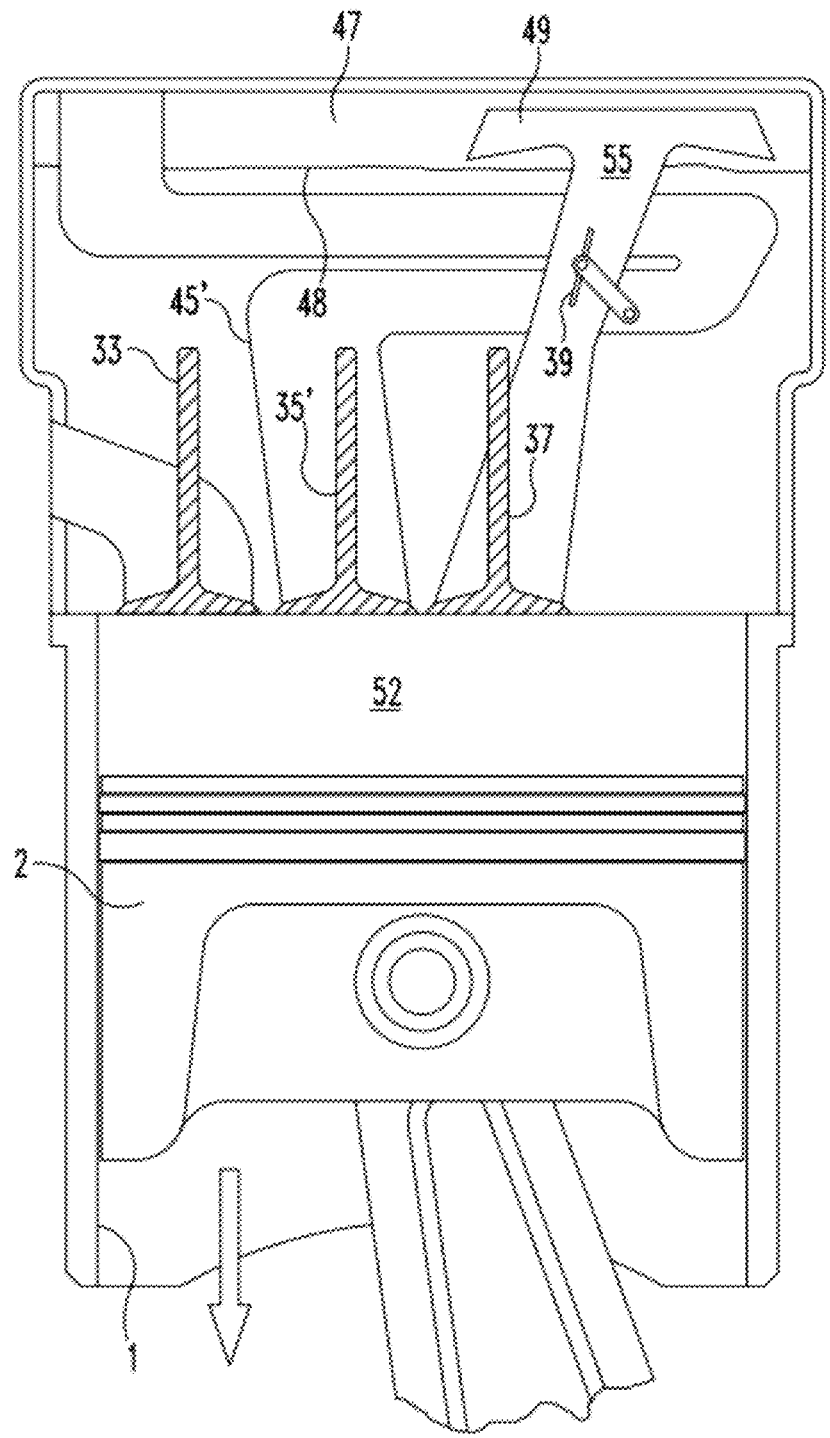
FIG. 18 is a diagrammatic illustration of a three valve cylinder of an internal combustion engine during a combustion power stroke according to one embodiment of the present disclosure.
Figure 19:
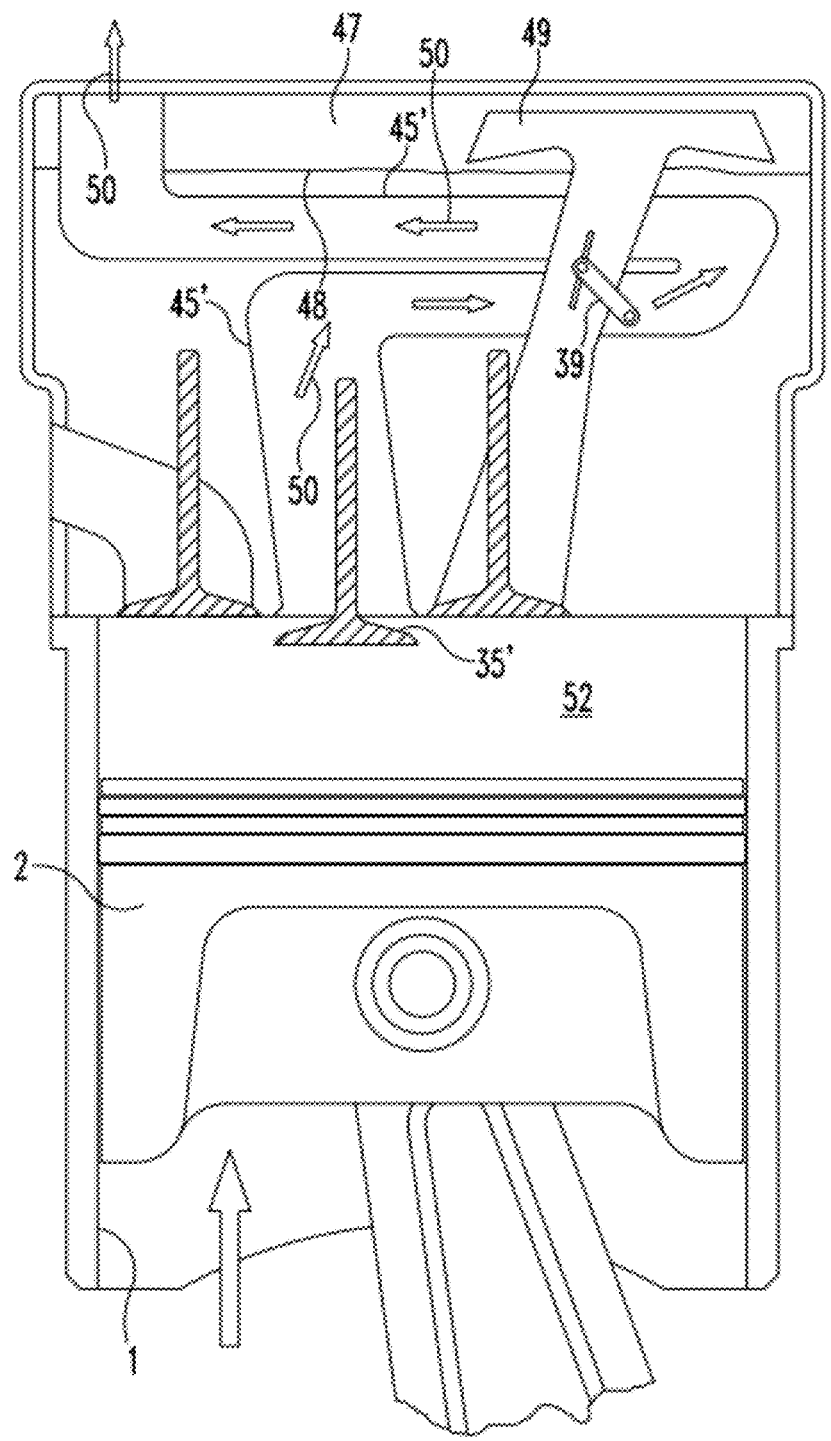
FIG. 19 is a diagrammatic illustration of a three valve cylinder of an internal combustion engine during a combustion exhaust stroke according to one embodiment of the present disclosure.
Figure 20:
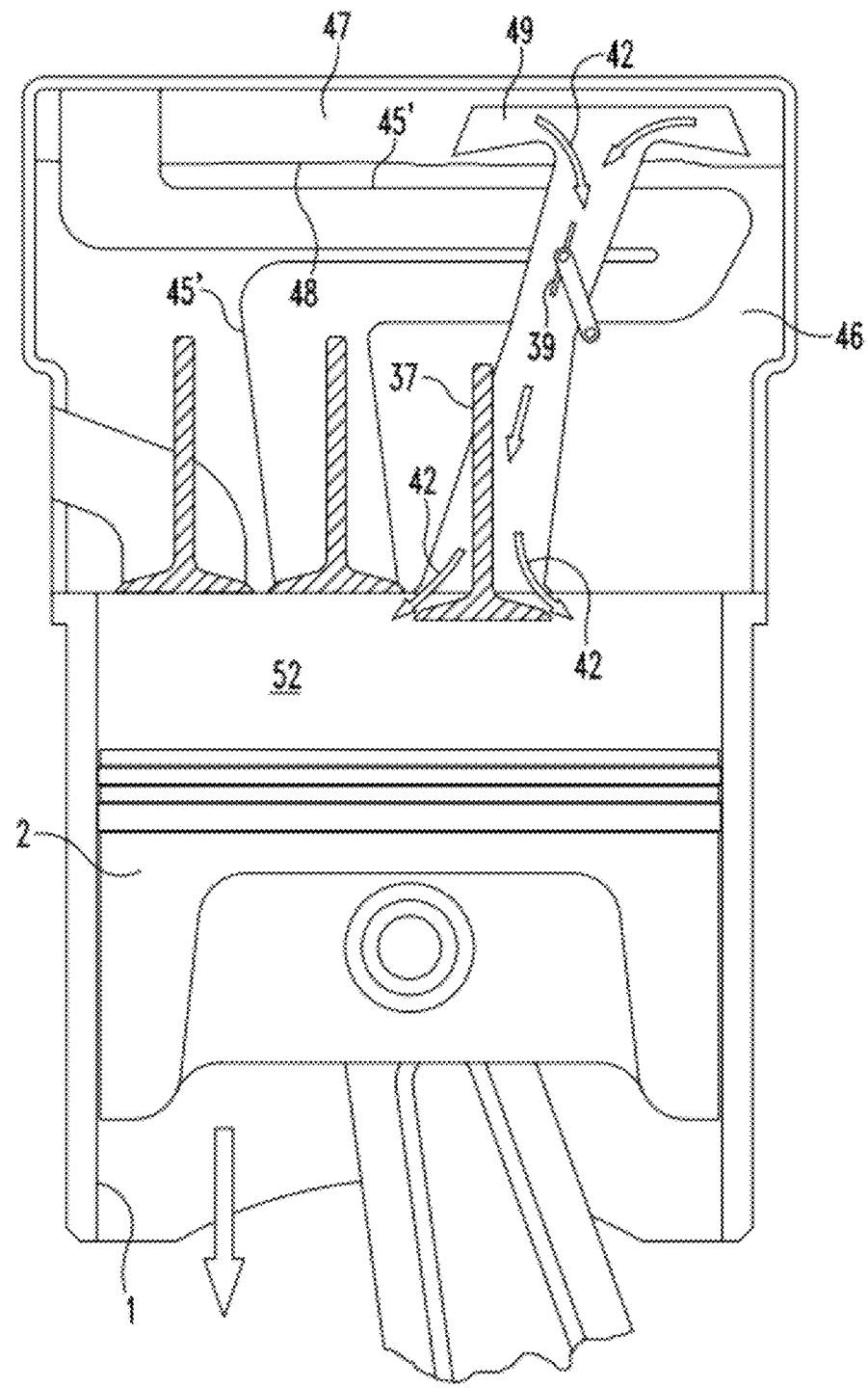
FIG. 20 is a diagrammatic illustration of a three valve cylinder of an internal combustion engine during a high pressure gas power stroke according to one embodiment of the present disclosure.

Similar cylinder head assembly designs may be used to provide an additional power stroke to existing combustion engines. FIGS. 10-15 illustrate a four valve cylinder head assembly 78. The various cycle strokes are illustrated: fuel and oxidizer intake stroke (FIG. 10), compression stroke (FIG. 11), combustion power stroke (FIG. 12), combustion exhaust stroke (FIG. 13), steam power stroke (FIG. 14), and spent steam exhaust stroke (FIG. 15). For brevity, the present discussion primarily focuses on the differences between cylinder head assembly 76 (FIGS. 3-8) and cylinder head assembly 78.

Like the other embodiments, insulating jacket 30 encloses a condensate reservoir 40 within cylinder head 51. However, instead of utilizing a heat exchanger filled with fluid, the illustrated embodiment includes a combustion exhaust conduit 45. Combustion exhaust conduit 45 is provided to communicate with combustion chamber 52 and supplies a combustion exhaust passage from combustion chamber 52. Combustion exhaust conduit 45 is typically closed by a combustion exhaust valve 35 which is periodically actuated in a conventional manner to enable the contents of the combustion chamber 52 to be exhausted following a combustion power stroke. Combustion exhaust conduit 45 is in fluid communication with exhaust manifold 28. Combustion exhaust conduit 45 is constructed and arranged to maximize the amount of surface area exposed to the liquid in condensate reservoir 40. Because combustion exhaust conduit 45 is made of a thermally conductive material, the heat of the combustion gases (shown generally as arrows 50 in FIG. 13) expunged from combustion chamber 52 during the combustion exhaust stroke is transferred to reservoir 40. Additionally, the heat of cylinder head 51 is transferred to reservoir 40. Eventually, steam is generated and enclosed within a cavity 47 delimited by the upper surface 48 of reservoir 40 and the walls of insulating jacket 30.

A steam inlet 49 is positioned at the top of steam conduit 55. During the steam power stroke (FIG. 14), steam inlet valve 37 is opened. Steam inlet 49 provides an entrance for the steam generated by the heating of reservoir 46 to flow (shown generally by arrows 42) from cavity 47 into combustion chamber 52 via steam conduit 55. The high temperature steam increases the pressure within combustion chamber 52 and, thereby, drives piston 2 downward.

Figure 21:
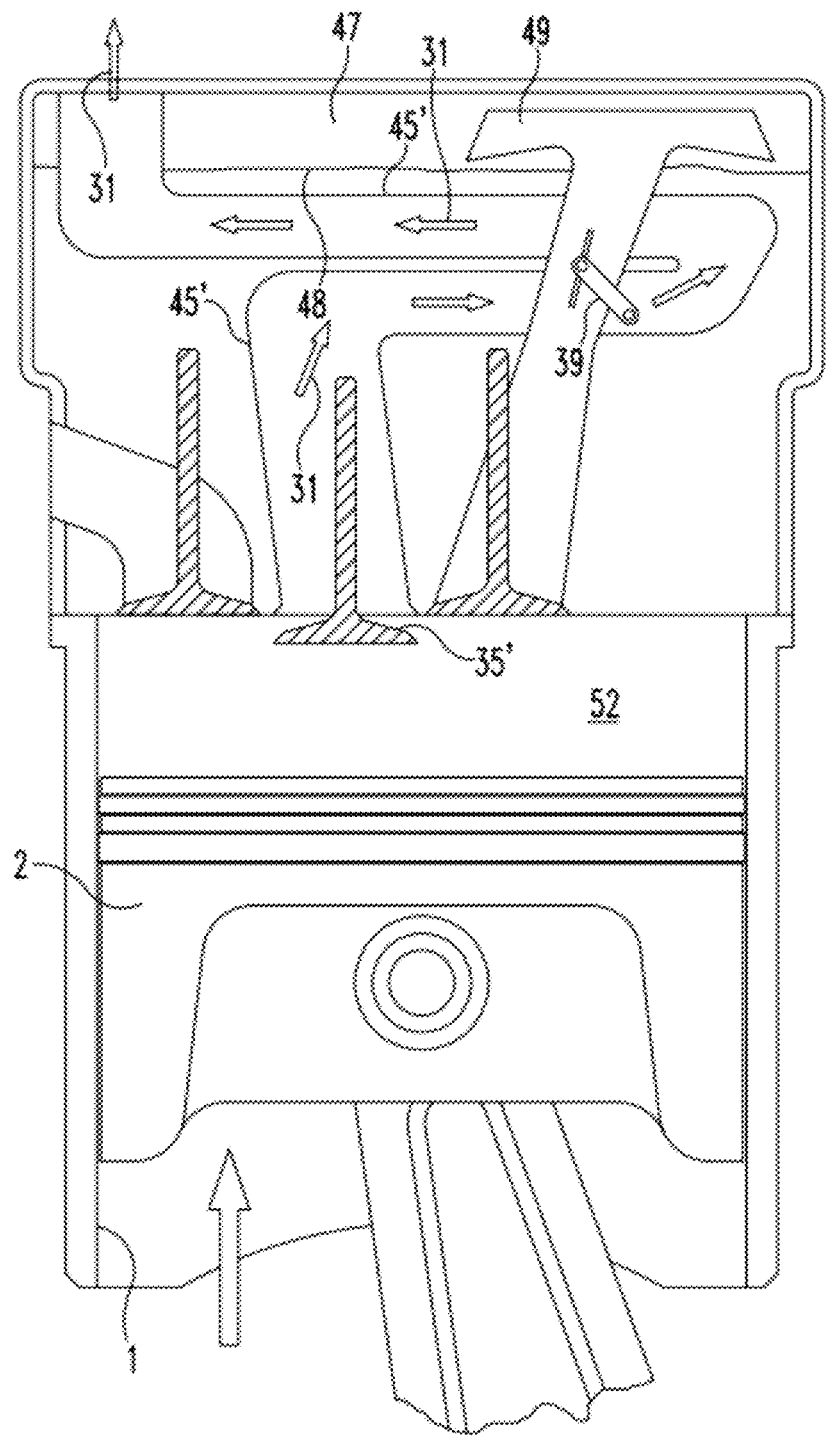
FIG. 21 is a diagrammatic illustration of a three valve cylinder of an internal combustion engine during a gas exhaust stroke according to one embodiment of the present disclosure.
Figure 22:
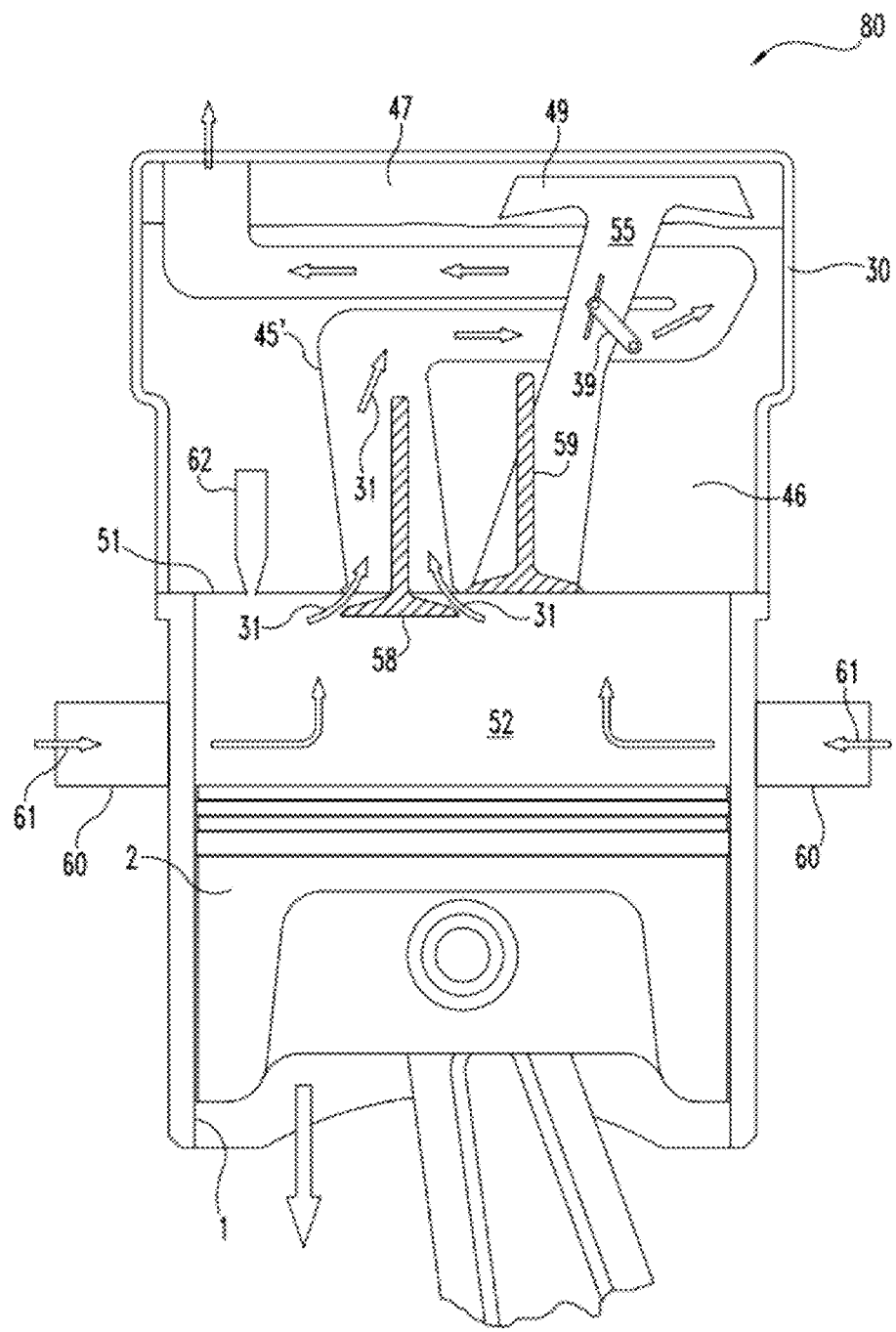
FIG. 22 is a diagrammatic illustration of a two valve cylinder of an internal combustion engine during an air intake and steam blow out stroke according to one embodiment of the present disclosure.
Figure 23:
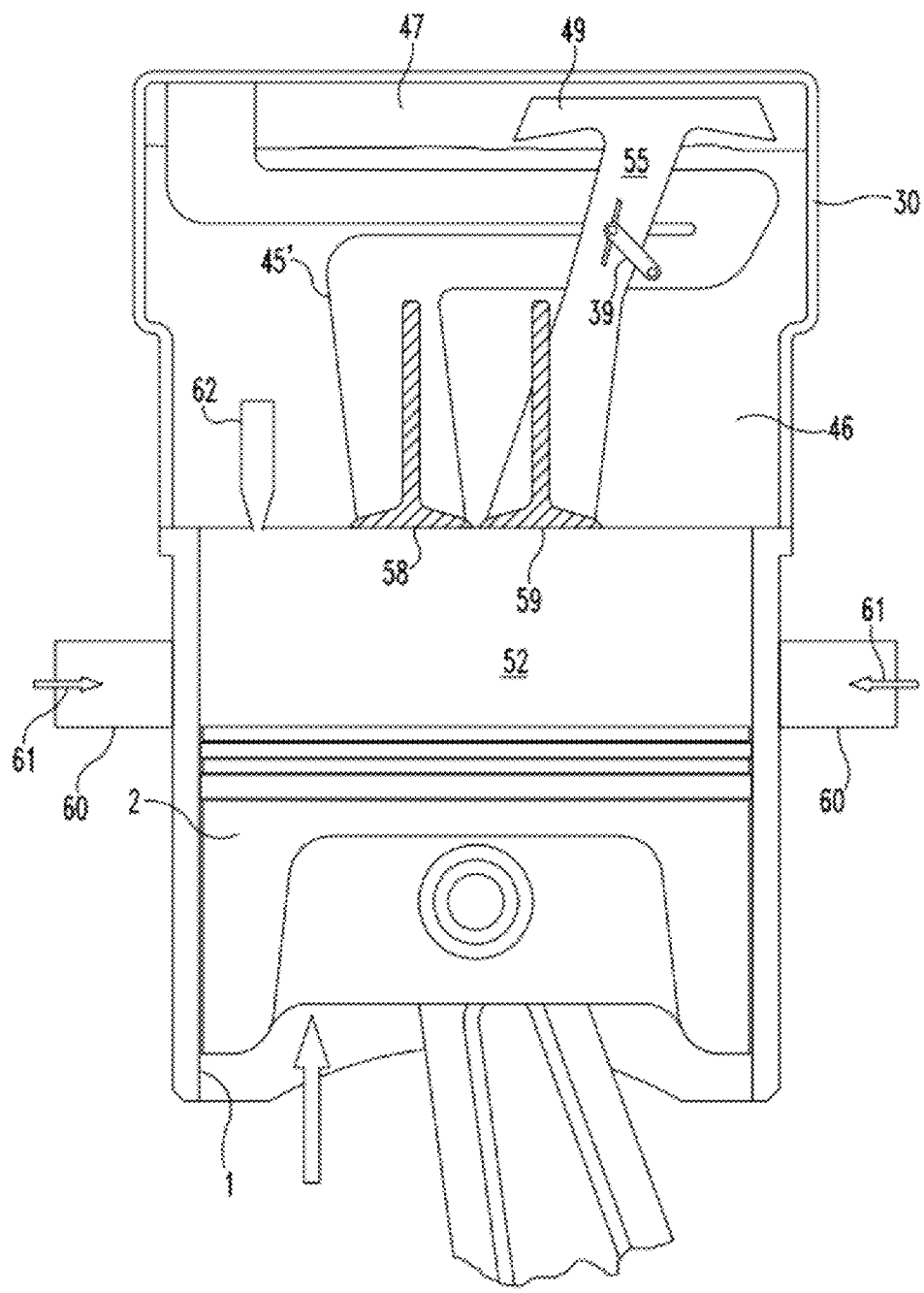
FIG. 23 is a diagrammatic illustration of a two valve cylinder of an internal combustion engine during a compression stroke according to one embodiment of the present disclosure.
Figure 24:
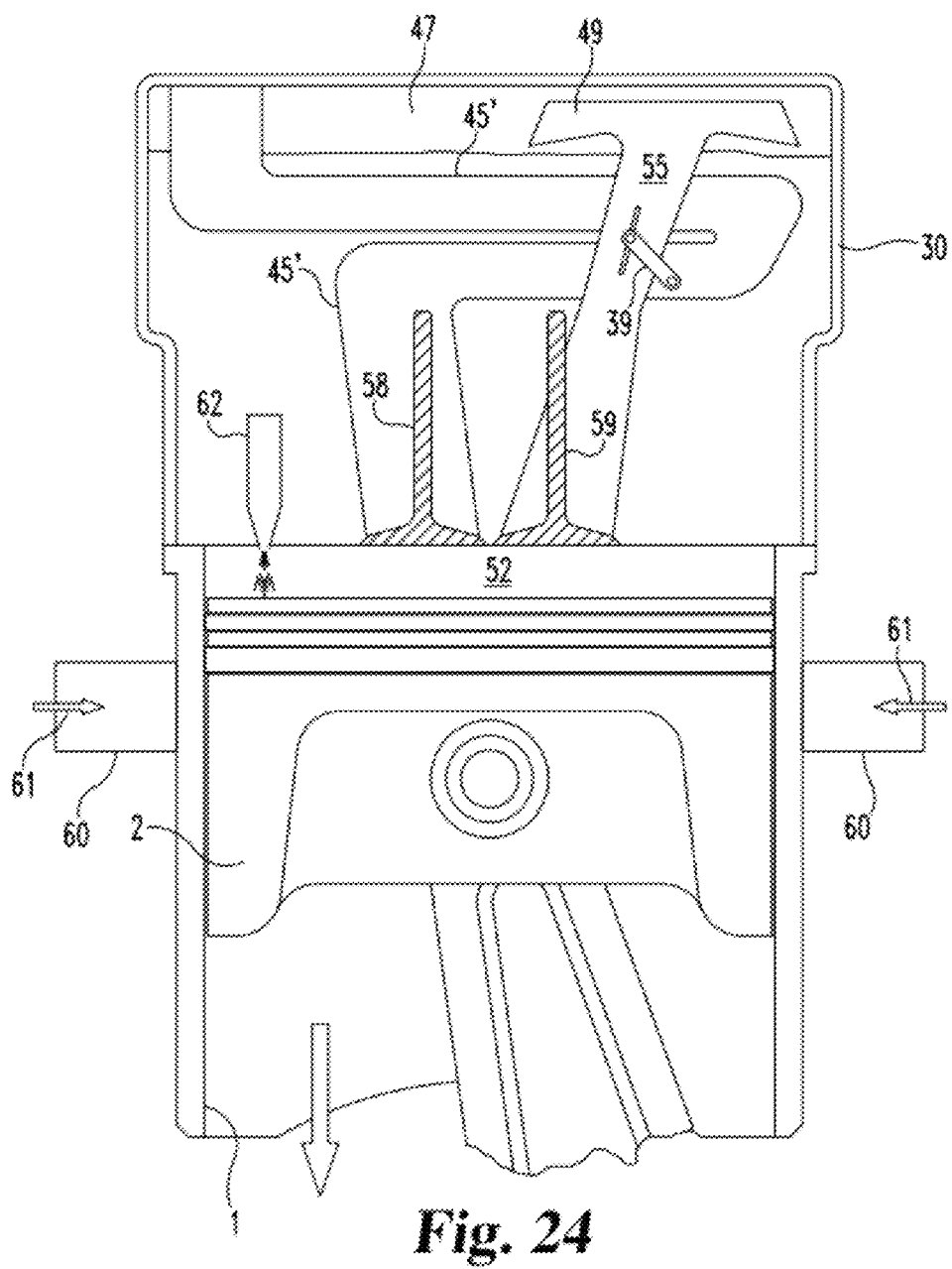
FIG. 24 is a diagrammatic illustration of a two valve cylinder of an internal combustion engine during a combustion power stroke according to one embodiment of the present disclosure.
Figure 25:
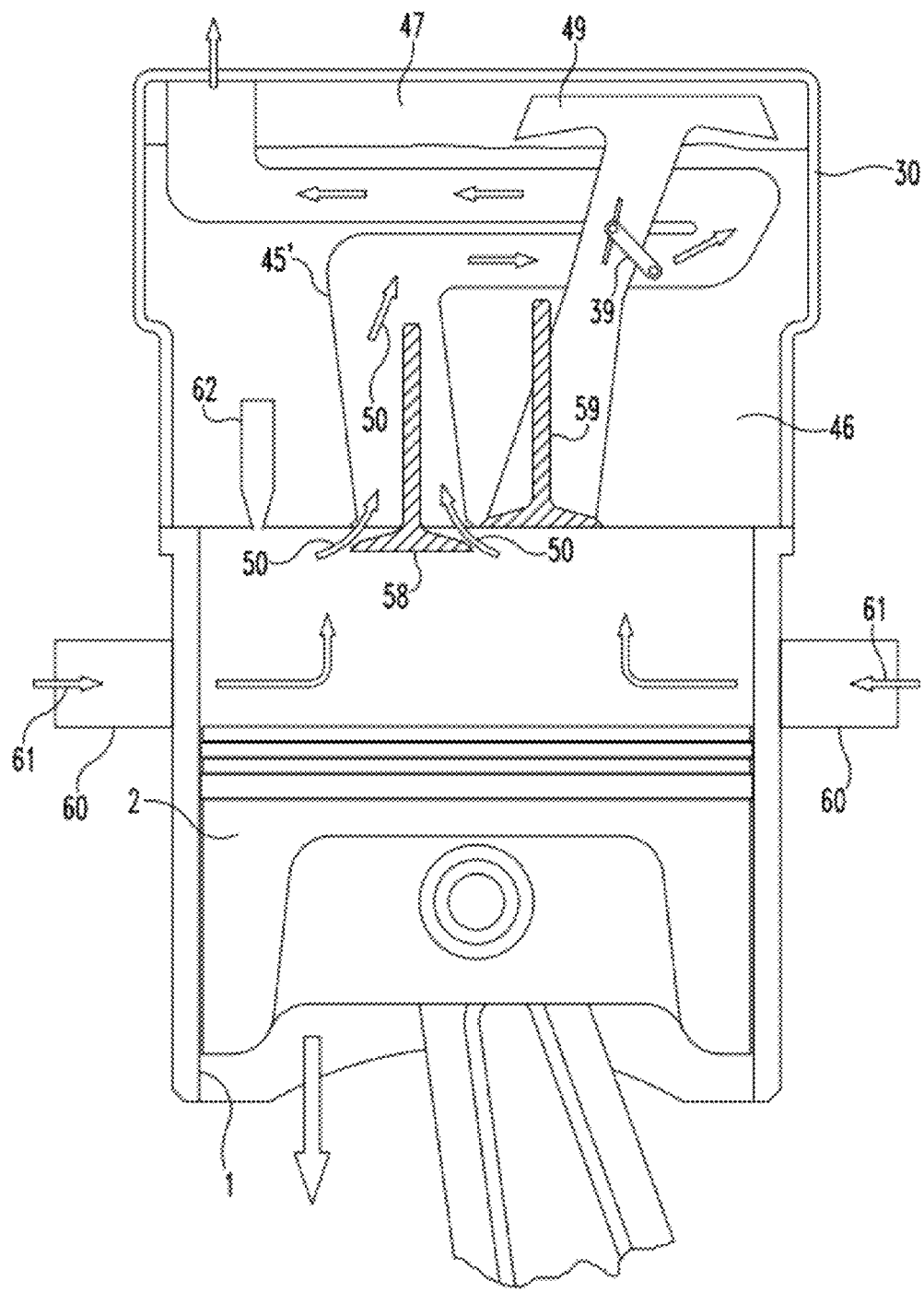
FIG. 25 is a diagrammatic illustration of a two valve cylinder of an internal combustion engine during a combustion exhaust stroke according to one embodiment of the present disclosure.

FIGS. 16-21 illustrate a three valve cylinder head assembly 79. The various cycle strokes are illustrated: fuel and oxidizer intake stroke (FIG. 16), compression stroke (FIG. 17), combustion power stroke (FIG. 18), combustion exhaust stroke (FIG. 19), steam power stroke (FIG. 20), and spent steam exhaust stroke (FIG. 21). In this embodiment, valve 35' functions as the exhaust valve for both the combustion gases and spent steam. Similarly, conduit 45' provides an exhaust passage for both combustion gases and spent steam. The operation of cylinder head assembly 79 is essentially the same as cylinder head assembly 78.

Figure 26:
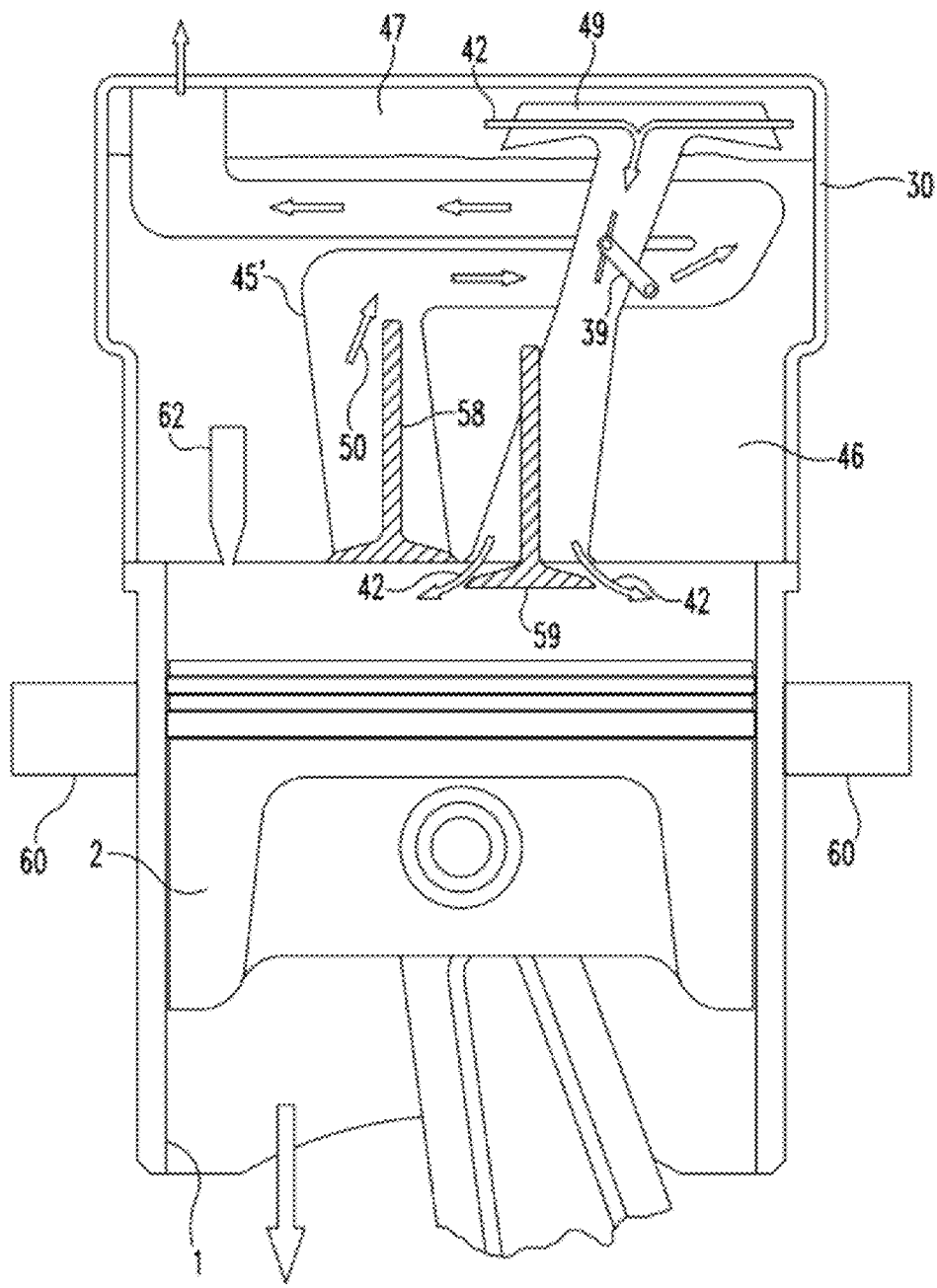
FIG. 26 is a diagrammatic illustration of a two valve cylinder of an internal combustion engine during a high pressure gas power stroke according to one embodiment of the present disclosure.

In other embodiments, a two cycle piston engine is modified to operate in a hybrid fuel combustion and high pressure gas mode. FIGS. 22-27 illustrate a two valve cylinder head assembly 80. The various cycle strokes are illustrated: air intake and gas blow down (FIG. 22), compression stroke (FIG. 23), fuel combustion and power stroke (FIG. 24), combustion gas blow down and exhaust stroke (FIG. 25), and steam power stroke (FIG. 26). In this embodiment, intake ports 60 are disposed in cylinder 1 near the bottom of the piston 2 stroke and are used to introduce oxidizing gas 61 (i.e., air) into combustion chamber 52. Exhaust valve 58 is provided to control the exhaustion of combustion products and spent steam from combustion chamber 52. Steam intake valve 59 and steam inlet throttle 39 are provided to control the introduction of steam from cavity 47 into combustion chamber 52.

A fuel injector 62 is mounted to the base of cylinder head 51 and projects into combustion chamber 52. Fuel injector 62 is provided to introduce diesel fuel, gasoline, or other fuel directly into combustion chamber 52. In one embodiment, fuel injector 62 does not inject fuel until intake ports 60 are closed during spark ignition or before piston 2 is top dead center in diesel cycles. In another embodiment, fuel injector 62 does not inject fuel until exhaust valve 58 is closed in order to prevent fuel passage from combustion chamber 52 before combustion. In order to ignite the injected fuel and initiate the combustion stroke (FIG. 24), both compression and sparked ignition are contemplated.

As illustrated, both spent steam 31 (FIG. 22) and combustion exhaust 50 (FIG. 25) are purged from combustion chamber 52 via conduit 45' after the appropriate power stroke. As hot combustion products and gases flow through the exhaust valve 53 and conduit 45', the heat from the combustion gases is transferred to the liquid of reservoir 46. After the liquid reaches its boiling point, the pressure of the gas maintained in cavity 47 is increased.

After the combustion exhaust stroke (FIG. 25) and at some point near piston 2 top dead center, steam intake valve 59 is opened and the steam power stroke is initiated (FIG. 26). Steam inlet 49 provides an entrance for the steam generated by the heating of reservoir 46 to flow (shown generally by arrows 42) from cavity 47 into combustion chamber 52 via steam conduit 55. The high temperature steam increases the pressure within combustion chamber 52 and, thereby, drives piston 2 downward.

Figure 27:
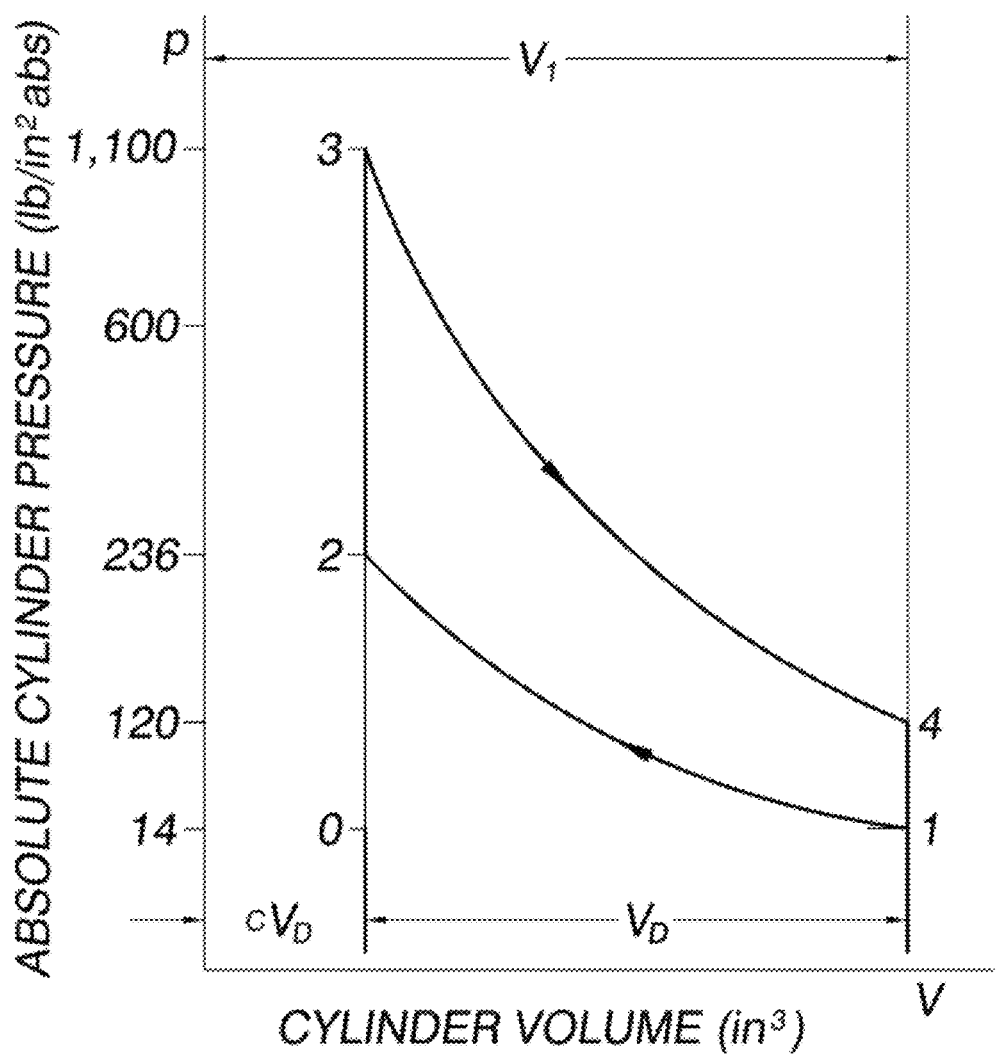
FIG. 27 is a typical pressure volume (PV) trace of a standard Otto cycle engine.
Figure 28:
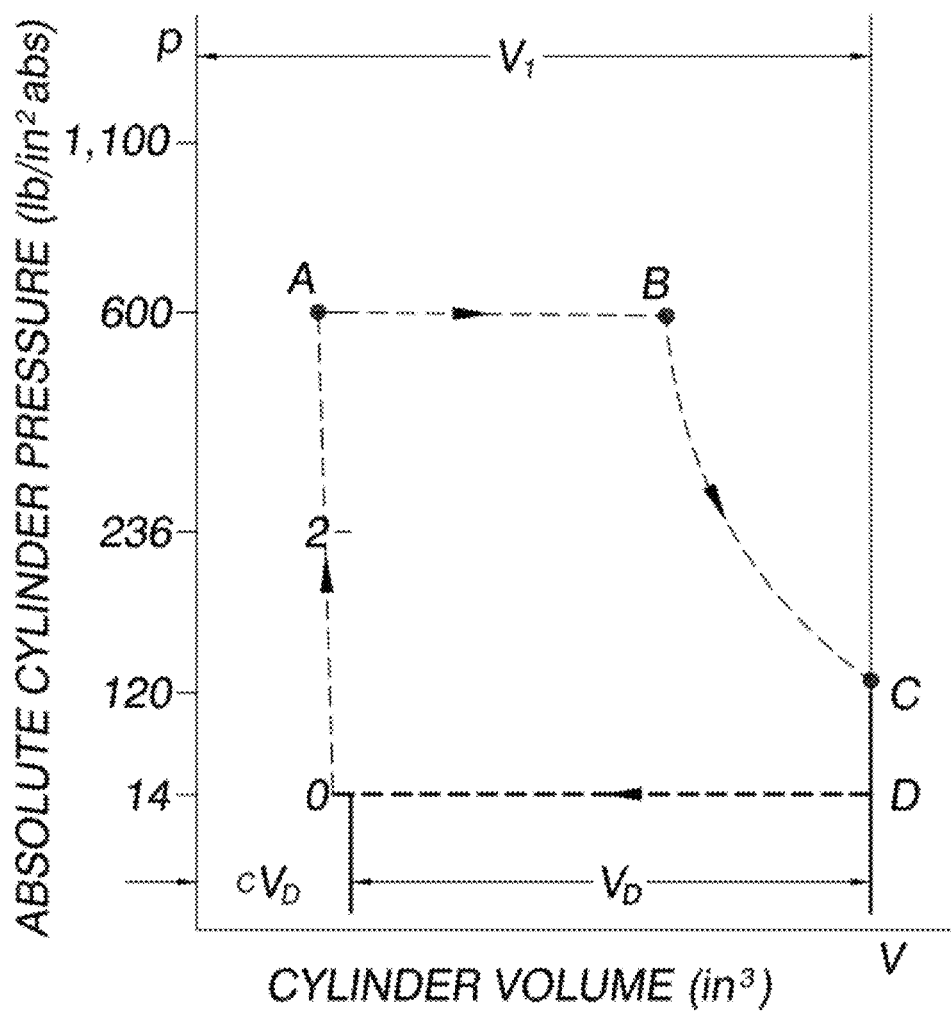
FIG. 28 is a typical PV trace of a standard steam Rankin cycle engine.
Figure 29:
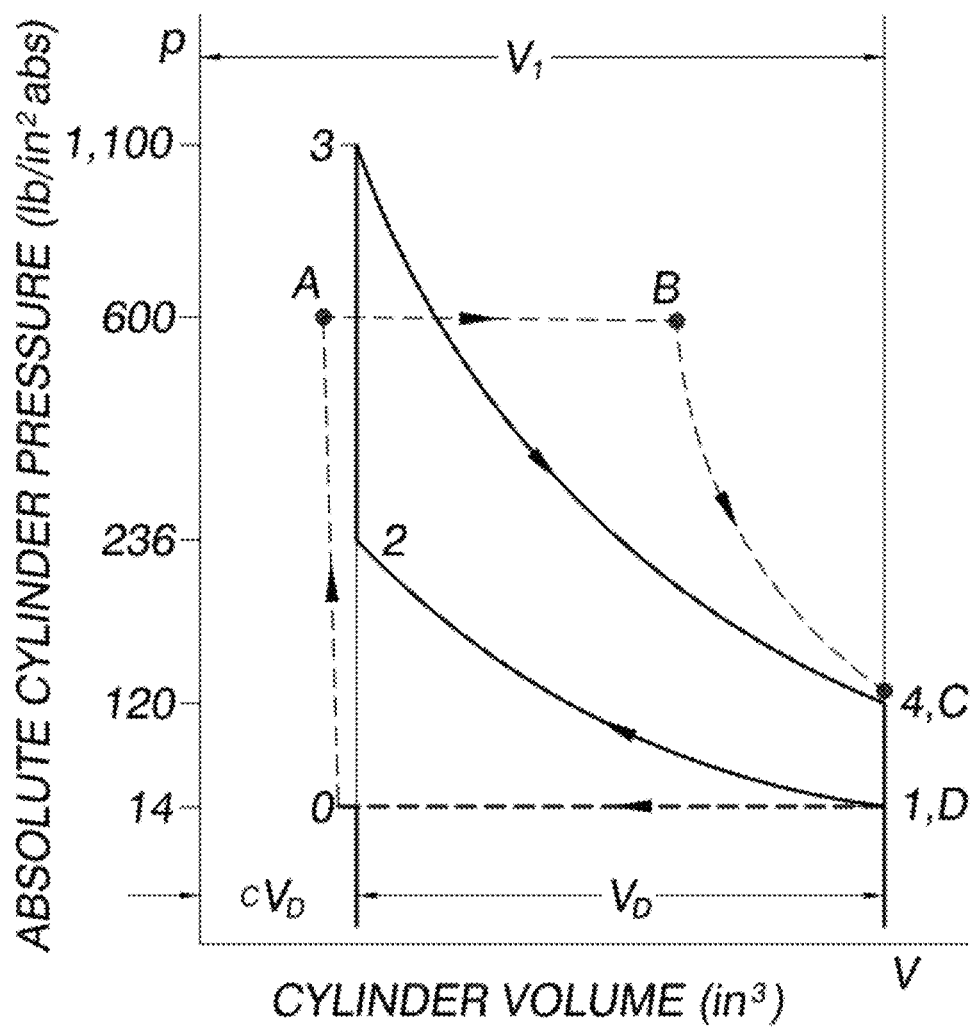
FIG. 29 illustrates an overlay of a typical PV trace of a standard steam Rankin cycle engine (dashed line) and standard Otto cycle engine (solid line).

FIG. 27 illustrates a typical pressure volume (PV) trace of a standard Otto cycle. FIG. 28 illustrates a typical PV trace of a standard steam Rankin cycle. FIG. 29 illustrates a PV trace of a Rankin cycle (dashed line) and Otto cycle (solid line) overlay. As understood by those of ordinary skill, the area contained in the cycle enclosed by the PV trace is indicative of the power produced by the expansion stroke. As illustrated in FIG. 29, the Rankin cycle maintains a lower peak pressure (roughly 600 PSIA) but that pressure is held constant for nearly 75% of the stroke. Therefore, the Rankin cycle producing more power with less stress on the engine due to lower peak pressures.

Figure 30:
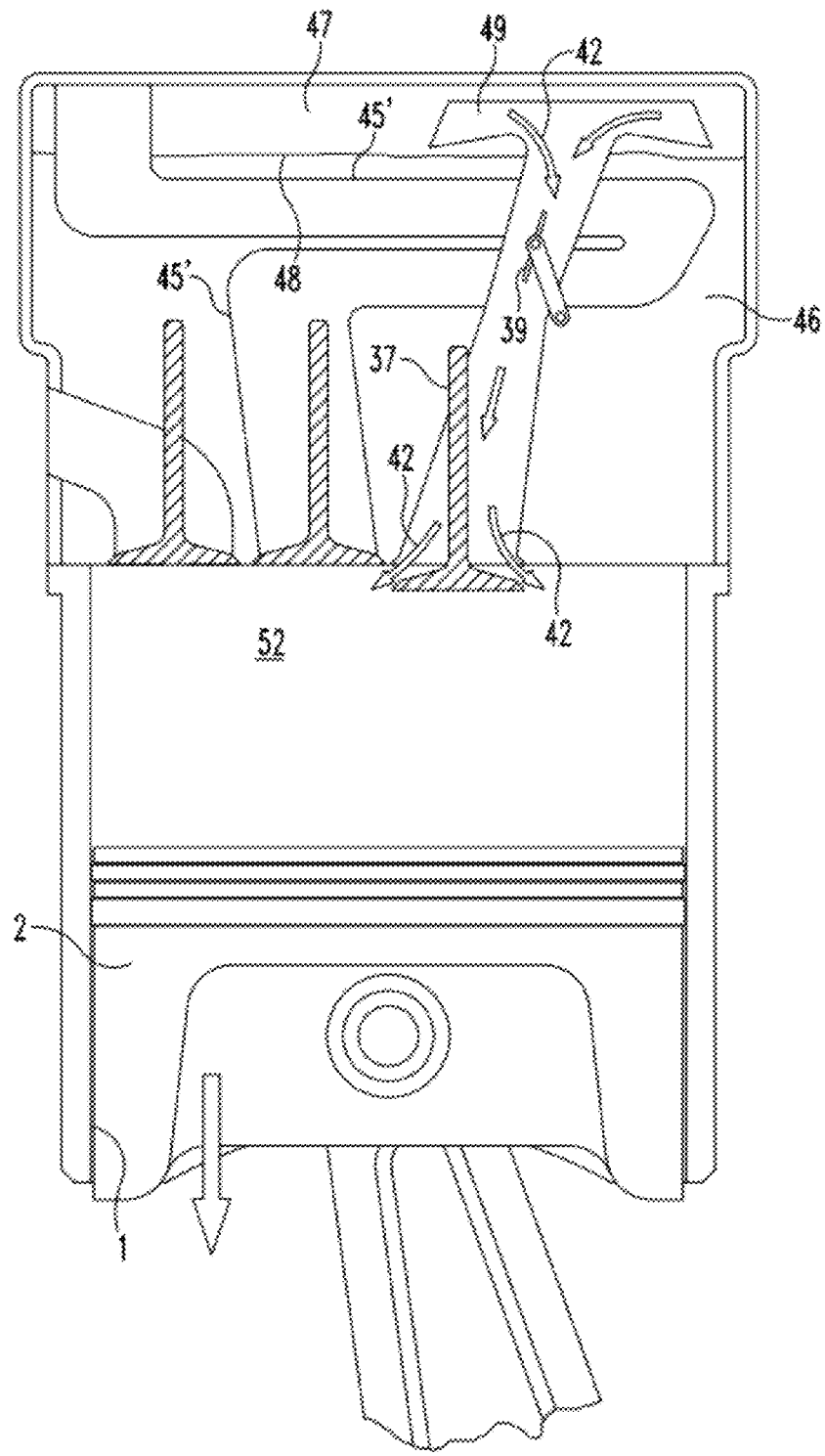
FIG. 30 is a diagrammatic illustration of a three valve cylinder of an internal combustion engine during a high pressure gas augmentation stroke according to one embodiment of the present disclosure.
Figure 31:
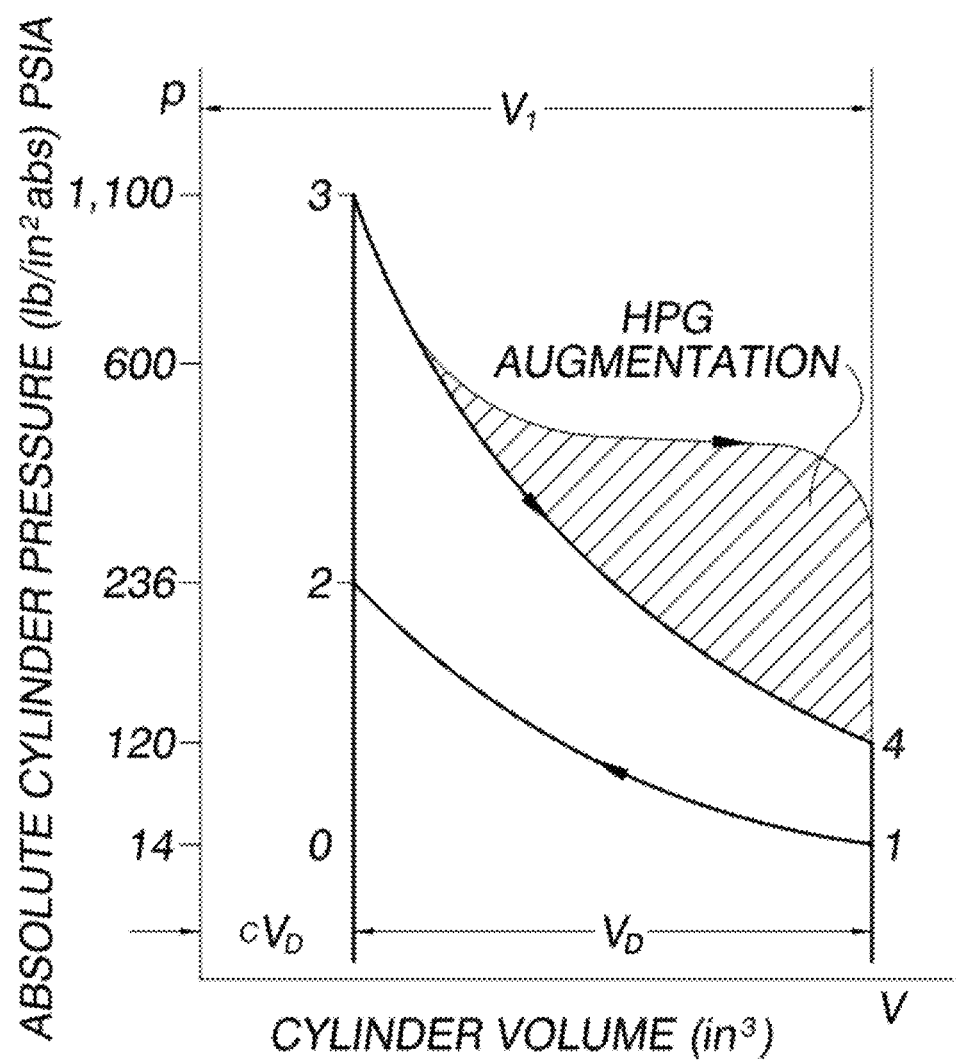
FIG. 31 illustrates the potential power increase due to the disclosed high pressure gas augmentation stroke illustrated in FIG. 30.

As explained herein, Otto cycle, diesel cycle and two cycle piston engines do not efficiently extract the energy of combustion because the expansion of the combustion chamber during the power stroke results in the depletion of pressure before the temperature of the combustion mixture approaches the ambient sink temperature. Therefore, one embodiment of the present disclosure provides a steam pressure augmentation system, which is illustrated in FIG. 30. Generally, the steam pressure augmentation system supplies additional power through the addition of steam pressure (represented by arrow 42) via a steam inlet valve 37 that communicates between the steam cavity 47 in the cylinder head and the combustion chamber 52. When the combustion gas pressure drops and piston 2 is near mid-stroke, steam inlet valve 37 opens and the introduced flow of steam 42 assists in maintaining a high pressure within combustion chamber 52. According to one embodiment, steam inlet valve 37 remains open until piston 2 is near bottom dead center. As can be appreciated by those of ordinary skill, the opening of steam inlet valve 37 and the increase in combustion chamber 52 pressure results in more power delivered. The potential power increase due to the disclosed high pressure gas augmentation is shown in the PV trace of FIG. 31.

Figure 32:
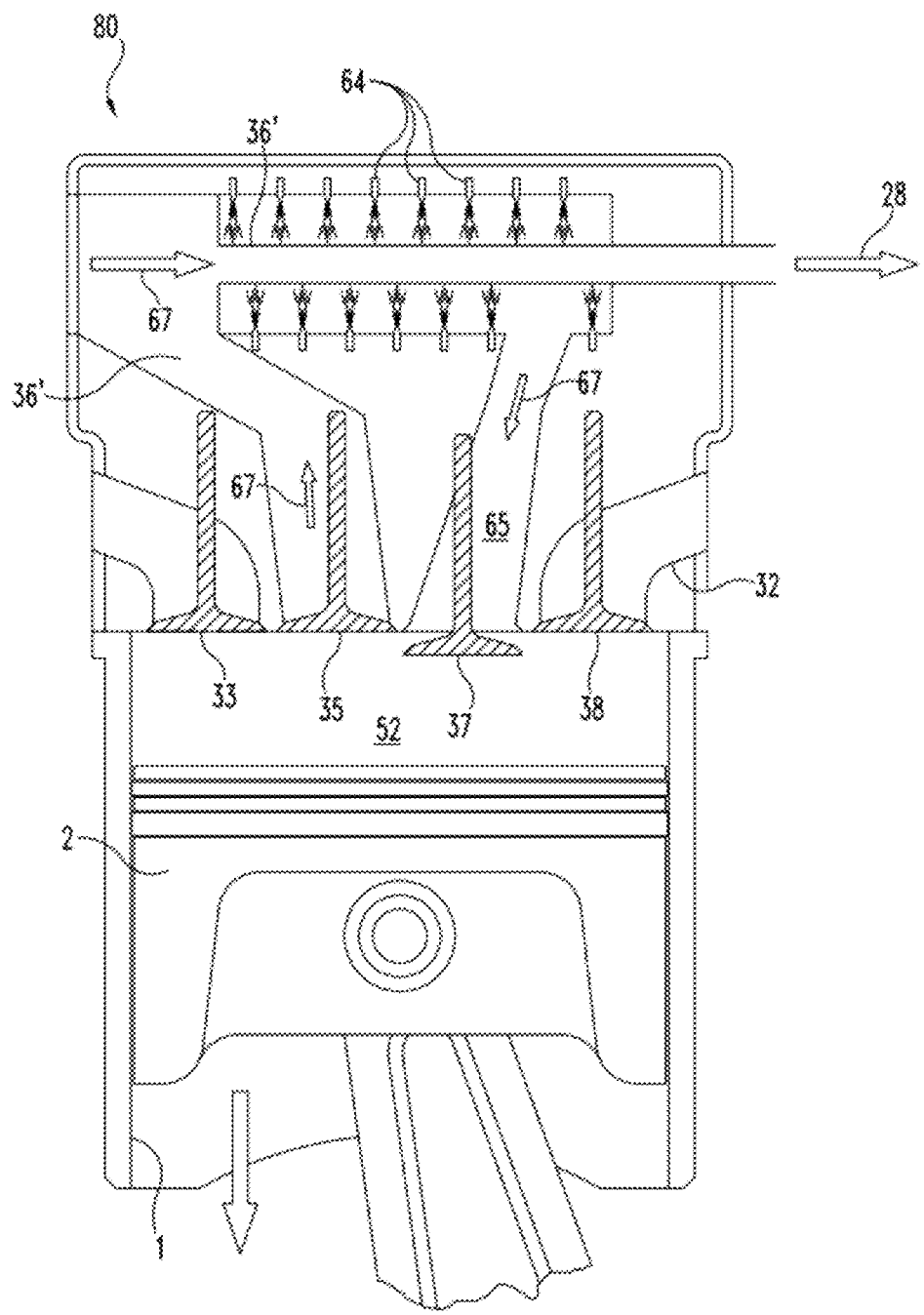
FIG. 32 is a diagrammatic illustration of a four valve cylinder of an internal combustion engine utilizing a flash boiler according to one embodiment of the present disclosure.

The previously described and illustrated embodiments utilize a high pressure gas (i.e., steam) that is generated by extracting heat from the cylinder head and exhaust stream. In alternative embodiments, high pressure gas can be generated in a heat exchanger in the exhaust piping. In yet further embodiments, the high pressure gas can be generated by a dry flash boiler or a wet boiler. An embodiment utilizing a flash boiler is illustrated in FIG. 32. As illustrated, a combustion exhaust conduit 36' is provided to communicate with combustion chamber 52 and supplies a combustion exhaust passage from combustion chamber 52. Combustion exhaust conduit 36' is typically closed by combustion exhaust valve 35 which is periodically actuated in a conventional manner to enable the contents of the combustion chamber 52 to be exhausted following a combustion power stroke. Combustion exhaust conduit 36' is in fluid communication with exhaust manifold 28.

A steam conduit 65 provides a cavity between conduit 36' and combustion chamber 52. Steam conduit 65 is typically closed by steam inlet valve 37 which is periodically actuated to enable high pressure gas contained in steam conduit 65 to be introduced into combustion chamber 52. A plurality of liquid injectors 64 are disposed within steam conduit 65 and face the surface of combustion exhaust conduit 36'. In operation, combustion exhaust conduit 36' functions as a heat exchanger and becomes hot as combustion gases are exhausted. When steam needed for a steam power stroke, injectors 64 spray a pre-determined amount of liquid onto conduit 36'. Because the temperature of conduit 36' is above the boiling point of the liquid, the liquid instantaneously turns to high pressure gas. Once steam inlet valve 37 is opened, the high pressure gas produced by the flash boiler is released into combustion chamber 52, thereby increasing the pressure inside combustion chamber 52 and forcing piston 2 downward. The flow of steam is shown generally by arrow 67.

In this embodiment, the larger heat exchanger improves transfer of energy from the exhaust stream to the engine coolant. In other embodiments, the heat exchanger can be made much larger than the engine cylinder head. One advantage of the flash boiler option is a reduction in the potential energy stored in the hot liquid of a wet boiler. The heat exchanger can be used in conjunction with the cylinder head heat exchanger to improve efficiency.

In a majority of the embodiments disclosed in the present disclosure, the spent high pressure gas and combustion products are delivered to a condenser 19 for liquid recycling. Condensing the combustion gases provide a means of make up water for steam generation. Hydrocarbon fuels produce approximately 1.35 pounds of water for every pound of fuel burned. Other products of combustion and exhaust gas with very low boiling points such as, carbon, monoxide, nitrogen, hydrocarbons, carbon dioxide, nitrous oxides ($NO_x$), oxygen, helium, etc., will be vented overboard from the condenser. The condenser thereby separates the water condensed from the exhaust combustion gases and spent steam from the low boiling point gases listed above. The spent steam and combustion gas products may enter the condenser below the liquid level to improve condensation of water vapor. This liquid water is pumped back into the system and used to generate high pressure gas, depending on embodiment.

As noted above, the combustion exhaust gases are cooled when heat energy is used to generate the high pressure gas. Therefore, the amount of heat rejection required in the condenser to reach the dew point is significantly reduced.

The various described herein may be operated with one condenser in a combined flow system (when the spent steam and combustion products are routed through the same condenser). According to one embodiment and as illustrated in FIG. 33, a condenser 82 may be used for the combined flow of combustion exhaust gases and spent high pressure gas. In this embodiment, a combustion products flow 68 and a spent steam flow 69 enter condenser 82. The condenser extracts the water and the following flows exit condenser 82: combustion products minus water 70 and air 71. The condensed water may then be sent back through the system by condensate pump 73. This option would require a near ambient pressure condenser to minimize exhaust back pressure. Reducing the condenser pressure would also require a larger condenser because the gas temperature must be dropped below the ambient pressure dew point to create liquid from the gases.

Separating the spent high pressure gas flow 69 and the combustion exhaust flow 68 would allow the use of two separate condensers optimized for the operating conditions. The high pressure gas flow 69 (i.e., spent steam) could be routed through spent steam condenser 84 operating at higher pressure, such as 50 lbs/in$^2$. For safety, a pressure release valve 74 may be provided. Spent steam condenser 84 is illustrated in FIG. 34. When extra make up liquid (i.e., water) is required or desired, the combustion exhaust stream flow 68 may then be diverted to a low pressure condenser 83 to recapture the liquid created from fuel combustion by products. Low pressure condenser is illustrated in FIG. 35. Operating the second condenser 83 at low pressure eliminates the undesirable exhaust back pressure.

Utilizing two dedicated condensers offers a variety of advantages: the combustion products exhaust gas condenser could be bypassed when make up water is not required; the combustion products exhaust gas condenser may be designed to minimize exhaust gas back pressure; the combustion products exhaust gas condenser could be constructed with materials that are resistant to the acids and corrosives in the exhaust stream; and each condenser can be optimized for flow rate, pressure and temperature to achieve maximum efficiency.

As described above, system 75 has the capability of acting as a regenerative dynamic brake. In one embodiment, spent high pressure gas is routed to the steam accumulator 18, where the energy is stored until the vehicle requires the application of power. One contemplated embodiment operates similar to "Jake Brake" systems on diesel engines. One way to accomplish the regenerative dynamic braking is to disable exhaust valve 5 when in dynamic braking mode. The modified engine cycles are as follows. The intake stroke results in the intake the oxidizer and/or fuel via the release of valve 3. Next, there is a compression and expansion stroke without fuel combustion. There is a second compression stroke due to the disabling of exhaust valve 5. High pressure gas is then injected into combustion chamber 52 by steam injector 6 before piston 2 reaches top dead center. During the final stroke, the spent steam and air is discharged from combustion chamber 52 and routed through steam exhaust manifold 32 to steam accumulator 18 by routing valve 16.

Pursuant to this embodiment, any fuel injection (gasoline or diesel) is interrupted while operating in the regeneration mode to insure combustible mixtures are not routed into the high pressure gas reservoirs. In another embodiment, pressure multiplying gas pump is also used to insure no combustible products are routed to accumulator 18. This embodiment utilizes air under pressure at the top of the compression stroke to power a pressure multiplying air pump to charge accumulator 18 with a mixture of high pressure steam and high pressure, high temperature air. The compression gases power the pump while the high pressure side of the pump consumes filtered ambient air to produce high pressure air (for example, 700 lbs/in$^2$) which is then delivered to accumulator 18. The mixture of spent steam and air is used during the auxiliary power stroke.

Some of the disclosed embodiments store energy in the form of high pressure gas. It is further contemplated that these reservoirs of energy can be used for auxiliary purposes. For example, the gas can be expanded across a turbine to power accessories such as turbochargers, power steering, alternators, and Freon compressors. Utilizing high pressure gas, such as steam, to power turbochargers has two advantages. First, as noted above, turbo lag can be nearly eliminated. Secondly, the materials used to manufacture the steam turbine are less costly because of the lower operating temperatures as compared to materials required for a combustion gas turbine.

The embodiments described herein use water heated to steam as a means of converting wasted heat energy into usable gas pressure. However, other solids, liquids, or gases can be used as a means for the same purpose. The material used must be convertible to higher pressure gas by the addition of heat. Several examples, but not all, of materials exhibiting the desired properties are: ice, water, refrigerant, metallic sodium, ammonia, carbon dioxide, sulfur dioxide, refrigerant R134, alcohol, propane, butane, Dowtherm®, liquid nitrogen, nitrogen gas, gasoline, toluene, acetone, methyl ethyl keatone, naptha, mineral spirits, etc. Generally, an efficient heat to energy conversion is by means of a phase change, i.e., heating ice or water to form high pressure steam.

While the present disclosure has been illustrated and described in detail in the drawings and foregoing description, the same is to be considered as illustrative and not restrictive in character, it being understood that only the preferred and other embodiments have been shown and described and that all changes, equivalents, and modifications that come within the spirit of the inventions defined by following claims are desired to be protected. It is also contemplated that structures and features embodied in the present examples can be altered, rearranged, substituted, deleted, duplicated, combined, or added to each other. The articles "the", "a" and "an" are not necessarily limited to mean only one, but rather are inclusive and open ended so as to include, optionally, multiple such elements.

What is claimed is:

1. An internal combustion engine comprising:
a cylinder defining a bore;
a piston disposed within said bore constructed and arranged to reciprocate in said bore;
a cylinder head disposed over said bore, wherein said bore, said piston and said cylinder head define a combustion chamber;
an intake valve constructed and arranged to introduce a combustible fuel into said combustion chamber;
an exhaust manifold in fluid communication with said combustion chamber constructed and arranged to exhaust combustion gases from said combustion chamber;
an exhaust valve constructed and arranged to selectively block fluid transfer between said combustion chamber and said exhaust manifold;
a reservoir constructed and arranged to contain water;
a heat exchanger in thermal communication with said exhaust manifold and in fluid communication with said reservoir and constructed and arranged to contain water, wherein said heat exchanger is constructed and arranged to transfer thermal energy between combustion gases in said exhaust manifold and water in said heat exchanger and wherein said heat exchanger defines separate flow paths for combustion gases and water such that combustion gases and water occupy different portions of said heat exchanger at all times;

a pump disposed between said heat exchanger and said reservoir constructed and arranged to transfer water from said reservoir to said heat exchanger;

an electronically controlled steam inlet valve in fluid communication with said combustion chamber and with said heat exchanger, wherein said steam inlet valve is disposed between said heat exchanger and said combustion chamber, wherein said steam inlet valve is constructed and arranged to inject water directly into said combustion chamber and wherein said steam inlet valve is constructed and arranged to selectively block water in said heat exchanger from entering said combustion chamber; and an engine control module programmed to control operation of said intake valve, said exhaust valve and said steam inlet valve to operate the internal combustion engine with a fuel combustion power stroke and a separate steam power stroke, wherein the maximum volume available to expand steam in said combustion chamber divided by the minimum volume available to expand steam in said combustion chamber is equal to the compression ratio defined by said bore, said cylinder head and the stroke of said piston in said cylinder.

2. The internal combustion engine of claim 1, wherein the engine control module is programmed to control operation of said intake valve, said exhaust valve and said steam inlet valve to operate the internal combustion engine with six cycles including an air intake stroke, a compression stroke, the fuel combustion power stroke, a combustion gas exhaust stroke, the steam power stroke and a steam exhaust stroke.

3. The internal combustion engine of claim 1, wherein said engine control module is programmed with a dynamic braking mode wherein said steam inlet valve is operated in opposition to reciprocation of said piston in said bore.

4. The internal combustion engine of claim 1, further comprising a temperature sensor constructed and arranged to determine the temperature of the fluid in said heat exchanger, wherein said temperature sensor is constructed and arranged to communicate the determined temperature of the fluid in said heat exchanger to said engine control module.

5. The internal combustion engine of claim 4, wherein said engine control module is programmed with a pressure/temperature table for the fluid and wherein said engine control module is programmed to operate said pump to maintain a set pressure of the fluid in said heat exchanger based on the determined temperature of the fluid in said heat exchanger to raise the boiling point of water in said heat exchanger significantly above the atmospheric pressure boiling point of water.

6. The internal combustion engine of claim 1, further comprising a liquid injector in fluid communication with said combustion chamber and said reservoir, wherein said liquid injector is constructed and arranged to selectively block fluid in said reservoir from entering said combustion chamber.

7. The internal combustion engine of claim 1, wherein said fuel combustion power stroke is initiated by sparked ignition.

8. The internal combustion engine of claim 1, wherein said fuel combustion power stroke is initiated by compressive ignition.

9. An internal combustion engine comprising:
a cylinder defining a bore;
a piston disposed within said bore constructed and arranged to reciprocate in said bore;
a cylinder head disposed over said bore, wherein said bore, said piston and said cylinder head define a combustion chamber;
an intake valve constructed and arranged to introduce combustible fuel into said combustion chamber;

an exhaust manifold in fluid communication with said combustion chamber constructed and arranged to exhaust combustion gases from said combustion chamber;

an exhaust valve constructed and arranged to selectively block fluid transfer between said combustion chamber and said exhaust manifold;

a reservoir constructed and arranged to contain water disposed within said cylinder head, wherein said exhaust manifold is in thermal communication with said reservoir arranged to directly transfer thermal energy between combustion gases in said exhaust manifold and water in said reservoir;

a steam inlet valve in fluid communication with said combustion chamber and with said reservoir, wherein said steam inlet valve is constructed and arranged to selectively block water in said reservoir from entering said combustion chamber;

a steam conduit between a top of said reservoir and said steam inlet valve; and an engine control module programmed to control operation of said intake valve, said exhaust valve and said steam inlet valve to operate the internal combustion engine with a fuel combustion power stroke and a separate steam power stroke.

10. The internal combustion engine of claim 9, further comprising an insulating jacket surrounding said cylinder head and said reservoir, wherein said insulating jacket is constructed and arranged to retard the passage of heat through said insulating jacket.

11. The internal combustion engine of claim 9, further comprising an intake port disposed within said cylinder proximate a bottom of the stroke of said piston, said intake port being arranged for introducing an oxidizing gas into said combustion chamber.

12. The internal combustion engine of claim 9, further comprising a steam throttle disposed between said steam inlet valve and said reservoir, wherein said steam throttle regulates the amount of steam that enters said combustion chamber through said steam inlet valve.

13. An internal combustion engine comprising:
a cylinder defining a bore;
a piston disposed within said bore constructed and arranged to reciprocate in said bore;
a cylinder head disposed over said bore, wherein said bore, said piston and said cylinder head define a combustion chamber;
an intake valve constructed and arranged to introduce a combustible fuel into said combustion chamber;
an exhaust manifold in fluid communication with said combustion chamber constructed and arranged to exhaust combustion gases from said combustion chamber;
an exhaust valve constructed and arranged to selectively block fluid transfer between said combustion chamber and said exhaust manifold;
a reservoir constructed and arranged to contain water;
a heat exchanger in thermal communication with said exhaust manifold and in fluid communication with said reservoir and constructed and arranged to contain water, wherein said heat exchanger is constructed and arranged to transfer thermal energy between combustion gases in said exhaust manifold and water in said heat exchanger and wherein said heat exchanger defines separate flow paths for combustion gases and water such that combustion gases and water occupy different portions of said heat exchanger at all times; and a steam injector in fluid communication with said combustion chamber and with said heat exchanger, wherein said steam injector is disposed between said heat exchanger and said combustion chamber, wherein said steam injector is constructed and arranged to inject water directly into said combustion chamber, wherein said steam injector is constructed and arranged to selectively block water in said heat exchanger from entering said combustion chamber and wherein the maximum volume available for steam expansion during a steam power stroke is equal to the maximum volume available for expansion of gases during a fuel combustion power stroke.

14. The internal combustion engine of claim 13, further comprising a temperature sensor constructed and arranged to determine the temperature of water in said heat exchanger.

15. The internal combustion engine of claim 14, further comprising a pump disposed between said heat exchanger and said reservoir constructed and arranged to transfer water from said reservoir to said heat exchanger, wherein said pump is controlled to pressurize water in said heat exchanger based on a pressure/temperature table and a determined water temperature of water so that water in said heat exchanger is super-heated to raise the boiling point of the pressurized water significantly above the atmospheric pressure boiling point of water.

16. The internal combustion engine of claim 13, further comprising a water injector in fluid communication with said combustion chamber and said reservoir, wherein said water injector is constructed and arranged to selectively block water in said reservoir from entering said combustion chamber.

17. The internal combustion engine of claim 13, further comprising:
a steam exhaust manifold in fluid communication with said combustion chamber constructed and arranged to exhaust steam from said combustion chamber; and
a steam exhaust valve constructed and arranged to selectively block steam transfer between said combustion chamber and said steam exhaust manifold.

18. The internal combustion engine of claim 17, further comprising:
a condenser in fluid communication with said steam exhaust manifold;
a steam accumulator in fluid communication with said steam exhaust manifold; and
a routing valve disposed within said steam exhaust manifold constructed and arranged to selectively fluidly couple either said condenser or said steam accumulator to said combustion chamber through said steam exhaust manifold.

19. The internal combustion engine of claim 18, further comprising:
an exhaust turbocharger turbine wheel in fluid communication with said exhaust manifold, wherein said exhaust turbocharger turbine wheel is constructed and arranged to generate rotational energy from exhausted combustion gases to rotate a turbocharger main shaft;
a steam turbocharger turbine wheel in fluid communication with said steam accumulator, wherein said steam turbocharger turbine wheel is constructed and arranged to generate rotational energy from exhausted steam to rotate the turbocharger main shaft; and
a steam throttle control valve disposed between said steam accumulator and said steam turbocharger turbine wheel, wherein said steam throttle control valve is constructed and arranged to regulate the flow of steam between said steam accumulator and said steam turbocharger turbine wheel.

20. The internal combustion engine of claim 19, wherein said exhaust turbocharger turbine wheel has a first area ratio and said steam turbocharger turbine wheel has a second area ratio smaller than said first area ratio.

* * * * *